United States Patent
Hobby et al.

(10) Patent No.: US 10,158,685 B1
(45) Date of Patent: Dec. 18, 2018

(54) VIEWING AND PARTICIPATING AT VIRTUALIZED LOCATIONS

(71) Applicant: Equisight Inc., McKinney, TX (US)

(72) Inventors: Kenleigh C. Hobby, Phoenix, AZ (US); Brendan Gowing, West Sussex (GB); David P. Matt, Missoula, MT (US)

( * ) Notice: Subject to any disclaimer, the term of this patent is extended or adjusted under 35 U.S.C. 154(b) by 52 days.

(21) Appl. No.: 14/961,817

(22) Filed: Dec. 7, 2015

Related U.S. Application Data

(63) Continuation of application No. 13/707,594, filed on Dec. 6, 2012, now Pat. No. 9,219,768.

(60) Provisional application No. 61/630,264, filed on Dec. 6, 2011.

(51) Int. Cl.
| | |
|---|---|
| G06F 15/16 | (2006.01) |
| H04L 29/06 | (2006.01) |
| G06Q 30/06 | (2012.01) |
| G06Q 50/10 | (2012.01) |
| H04L 29/08 | (2006.01) |

(52) U.S. Cl.
CPC ..... H04L 65/4069 (2013.01); *G06Q 30/0603* (2013.01); *G06Q 50/10* (2013.01); *H04L 29/08072* (2013.01); *H04L 65/60* (2013.01)

(58) Field of Classification Search
CPC .... G06Q 30/02; G06Q 10/103; G06Q 10/109; G06Q 10/20; G06Q 20/10; G06Q 30/0203; G06Q 30/0601; G06Q 40/00; G06Q 50/08; G06Q 50/163; G06Q 10/087; G06Q 10/1053; G06Q 20/102; G06Q 20/203; G06Q 30/00; G06Q 30/0202; G06Q 30/02; G06Q 30/0603; G06Q 50/10; H04L 65/4069; H04L 65/60; H04L 29/08072

USPC .......... 709/203, 219, 223–229, 250
See application file for complete search history.

(56) References Cited

U.S. PATENT DOCUMENTS

| | | |
|---|---|---|
| 3,991,422 A | 11/1976 | Saotome |
| 4,091,470 A | 5/1978 | Ryunoshin |
| 4,539,715 A | 9/1985 | Clement |
| 5,570,150 A | 10/1996 | Yoneyama et al. |
| 5,886,739 A | 3/1999 | Winningstad |
| 6,028,627 A | 2/2000 | Helmsderfer |
| 6,043,837 A | 3/2000 | Driscoll, Jr. et al. |
| 6,182,116 B1 | 1/2001 | Namma et al. |
| 6,292,213 B1 | 9/2001 | Jones |
| 6,564,380 B1 | 5/2003 | Murphy |

(Continued)

FOREIGN PATENT DOCUMENTS

| | | |
|---|---|---|
| CA | 1 116 801 | 1/1982 |
| CN | 2891719 Y | 4/2007 |

(Continued)

OTHER PUBLICATIONS

Henrikkson, Sofia, "Concept Development of communications-enabled motorcycle helmet", KTH School of Industrial Engineering and Management, Machine Design dept., Feb. 27, 2009.

(Continued)

*Primary Examiner* — Krisna Lim

(57) ABSTRACT

In one embodiment of the invention, a system provides virtual presence model in servers. An embodiment of the invention also has video streaming capability and can allow a user to select which video to watch as the large, central video with some statistics and data on side portions of the user interface.

20 Claims, 16 Drawing Sheets

(56) References Cited

U.S. PATENT DOCUMENTS

| | | | |
|---|---|---|---|
| 6,698,021 B1 | 2/2004 | Amini et al. | |
| 6,704,044 B1 | 3/2004 | Foster et al. | |
| 6,798,392 B2 | 9/2004 | Hartwell et al. | |
| 6,819,354 B1 | 11/2004 | Foster et al. | |
| 6,891,566 B2 | 5/2005 | Marchese | |
| 7,186,159 B1 | 3/2007 | Baxter | |
| 7,302,644 B2 | 11/2007 | Holtz et al. | |
| 7,382,244 B1 | 6/2008 | Donovan et al. | |
| 7,487,112 B2 | 2/2009 | Barnes, Jr. | |
| 7,671,893 B2 | 3/2010 | Li et al. | |
| 7,710,452 B1 | 5/2010 | Lindberg | |
| 7,764,308 B2 | 7/2010 | Kusaka et al. | |
| 7,812,842 B2 | 10/2010 | Gordon | |
| 7,881,715 B2 | 2/2011 | Kirani et al. | |
| 7,956,892 B2 | 6/2011 | Frederick | |
| 8,001,623 B2 | 8/2011 | Gertsch et al. | |
| 8,020,220 B2 | 9/2011 | McElroy et al. | |
| 8,166,573 B1 | 5/2012 | Chung et al. | |
| 8,319,845 B2 | 11/2012 | Ortiz | |
| 8,589,488 B2 | 11/2013 | Huston et al. | |
| 8,638,368 B2 | 1/2014 | Frederick | |
| 8,797,165 B2 * | 8/2014 | Greenwald | A61B 5/0002 2/411 |
| 8,831,677 B2 | 9/2014 | Villa-Real | |
| 9,024,972 B1 * | 5/2015 | Bronder | G06T 19/006 345/633 |
| 9,143,667 B1 | 9/2015 | Liverman et al. | |
| 9,219,768 B2 * | 12/2015 | Hobby | H04L 65/60 |
| 9,389,677 B2 | 7/2016 | Hobby et al. | |
| 9,445,639 B1 | 9/2016 | Aloumanis et al. | |
| 2002/0021354 A1 | 2/2002 | Suzuki et al. | |
| 2002/0120939 A1 | 8/2002 | Wall et al. | |
| 2002/0154417 A1 | 10/2002 | Wallerstein et al. | |
| 2002/0184641 A1 | 12/2002 | Johnson et al. | |
| 2003/0043191 A1 | 3/2003 | Tinsley et al. | |
| 2003/0071766 A1 * | 4/2003 | Hartwell | A42B 3/30 345/8 |
| 2003/0080878 A1 | 5/2003 | Kirmuss | |
| 2003/0133008 A1 | 7/2003 | Stephenson | |
| 2003/0163827 A1 | 8/2003 | Purpura | |
| 2004/0078825 A1 | 4/2004 | Murphy | |
| 2005/0078195 A1 | 4/2005 | Vanwagner | |
| 2005/0162381 A1 | 7/2005 | Bell et al. | |
| 2005/0168485 A1 | 8/2005 | Nattress | |
| 2005/0179811 A1 | 8/2005 | Palatov | |
| 2006/0050929 A1 | 3/2006 | Rast et al. | |
| 2006/0072007 A1 | 4/2006 | Gilor | |
| 2006/0277666 A1 | 12/2006 | Gertsch et al. | |
| 2007/0022445 A1 | 1/2007 | Arseneau et al. | |
| 2007/0135979 A1 | 6/2007 | Plante | |
| 2007/0188612 A1 | 8/2007 | Carter | |
| 2007/0219686 A1 | 9/2007 | Plante | |
| 2008/0082311 A1 * | 4/2008 | Meijer | G06F 3/011 703/24 |
| 2008/0106597 A1 | 5/2008 | Amini et al. | |
| 2008/0170838 A1 | 7/2008 | Teetzel et al. | |
| 2008/0192117 A1 | 8/2008 | Shanks et al. | |
| 2009/0013052 A1 | 1/2009 | Robarts et al. | |
| 2009/0058988 A1 | 3/2009 | Strzempko et al. | |
| 2009/0059013 A1 | 3/2009 | Yu | |
| 2009/0109292 A1 | 4/2009 | Ennis | |
| 2009/0237564 A1 | 9/2009 | Kikinis et al. | |
| 2010/0080418 A1 | 4/2010 | Ito | |
| 2010/0182436 A1 | 7/2010 | Boman et al. | |
| 2010/0225758 A1 | 9/2010 | Mashiah | |
| 2010/0245585 A1 | 9/2010 | Fisher et al. | |
| 2011/0030021 A1 | 2/2011 | Campagna et al. | |
| 2011/0069146 A1 | 3/2011 | Wang et al. | |
| 2011/0128347 A1 | 6/2011 | Theobald | |
| 2011/0140913 A1 | 6/2011 | Montenero | |
| 2011/0182257 A1 | 7/2011 | Raveendran et al. | |
| 2011/0197327 A1 | 8/2011 | McElroy et al. | |
| 2012/0026300 A1 | 2/2012 | Kakiuchi et al. | |
| 2012/0113153 A1 | 5/2012 | Casner | |
| 2012/0198603 A1 | 8/2012 | Gertsch et al. | |
| 2012/0206565 A1 | 8/2012 | Villmer | |
| 2013/0033610 A1 | 2/2013 | Osborn | |
| 2013/0050401 A1 | 2/2013 | Tannhaeuser et al. | |
| 2013/0128046 A1 | 5/2013 | Gindin | |
| 2013/0141523 A1 | 6/2013 | Banta et al. | |
| 2013/0182116 A1 | 7/2013 | Arima | |
| 2013/0204930 A1 | 8/2013 | Hobby et al. | |
| 2013/0314508 A1 | 11/2013 | Arima | |
| 2014/0000013 A1 | 1/2014 | Redpath et al. | |
| 2014/0020159 A1 | 1/2014 | Teetzel et al. | |
| 2014/0075655 A1 | 3/2014 | Ratner et al. | |
| 2014/0189937 A1 | 7/2014 | Pietrzak et al. | |
| 2014/0348484 A1 | 11/2014 | Erwin et al. | |
| 2014/0362244 A1 | 12/2014 | Martin | |
| 2015/0124060 A1 | 5/2015 | Hasegawa et al. | |
| 2015/0138354 A1 | 5/2015 | Miller | |
| 2015/0145990 A1 | 5/2015 | Jones | |
| 2015/0271367 A1 | 9/2015 | Musec et al. | |
| 2016/0080649 A1 | 3/2016 | Bex et al. | |
| 2016/0241794 A1 | 8/2016 | Lee et al. | |
| 2016/0248995 A1 | 8/2016 | Mullins et al. | |
| 2016/0249020 A1 | 8/2016 | Mingo | |
| 2016/0344984 A1 | 11/2016 | Fitzgerald | |

FOREIGN PATENT DOCUMENTS

| | | |
|---|---|---|
| CN | 202304608 U | 7/2012 |
| CN | 202424926 U | 9/2012 |
| CN | 203618853 U | 6/2014 |
| CN | 203633569 U | 6/2014 |
| DE | 32 32 762 | 4/1983 |
| DE | 19650442 A1 | 6/1998 |
| DE | 10062406 A1 | 12/2002 |
| DE | 20214241 | 12/2002 |
| DE | 102009012450 | 9/2010 |
| EP | 0 150 876 | 8/1985 |
| EP | 0 279 086 | 8/1988 |
| EP | 1103194 | 5/2001 |
| GB | 2446724 | 8/2008 |
| KR | 1414411 B1 | 7/2014 |
| WO | WO 1998/023177 | 6/1998 |
| WO | WO 2003/026452 | 4/2003 |
| WO | WO 2004/019717 | 3/2004 |
| WO | WO 2007/059575 | 5/2007 |
| WO | WO 2010/090473 | 8/2010 |
| WO | WO 2011/027190 | 3/2011 |

OTHER PUBLICATIONS

Notification of Transmittal or the Declaration, International Search Report, Written Opinion of the ISR, and Search History for PCT/US12/61755, dated Feb. 1, 2013.

Notification of Transmittal or the Declaration, International Search Report, Written Opinion of the ISR, and Search History for PCT/US12/68320, dated Apr. 5, 2013.

Office Action dated Apr. 1, 2014 for U.S. Appl. No. 13/658,793; inventors Kenleigh C. Hobby et al.

Office Action dated Dec. 12, 2014 for U.S. Appl. No. 13/658,793; inventors Kenleigh C. Hobby et al.

Office Action dated Oct. 8, 2014 for U.S. Appl. No. 13/658,793; inventors Kenleigh C. Hobby et al.

Office Action dated Feb. 3, 2015 for U.S. Appl. No. 13/658,793; inventors Kenleigh C. Hobby et al.

Office Action dated Feb. 2, 2017 for U.S. Appl. No. 15/206,225; inventors Kenleigh C. Hobby et al.

Office Action dated Jun. 5, 2017 for U.S. Appl. No. 15/206,225; inventors Kenleigh C. Hobby et al.

Office Action dated Oct. 11, 2017 for U.S. Appl. No. 15/206,225; inventors Kenleigh C. Hobby et al.

Almudena Diaz et al.,Evaluating Video Streaming over GPRS/UMTS networks: A practical case,Apr. 2007;Vehicular Technology Conference,2007.VTC2007-Spring.IEEE 65th; pp. 624-628.

Garg et al.,Third generation (3G) mobile communication systems; Feb. 1999;1999 IEEE International Conference on Personal Wireless Communication; IEEE.

(56) References Cited

OTHER PUBLICATIONS

Office Action dated Jun. 5, 2015 for U.S. Appl. No. 13/658,793.
Office Action dated Feb. 3, 2015 for U.S. Appl. No. 13/658,793.
Office Action dated Oct. 26 2015 for U.S. Appl. No. 13/658,793.
Notice of Allowance/Allowability dated Mar. 3, 2016 for U.S. Appl. No. 13/658,793.
Office Action dated Oct. 23, 2014 for U.S. Appl. No. 13/707,594; inventors Kenleigh C. Hobby et al.
Office Action dated May 11, 2015 for U.S. Appl. No. 13/707,594; inventors Kenleigh C. Hobby et al.
Notice of Allowance/Allowability dated Aug. 3, 2015 for U.S. Appl. No. 13/707,594; inventors Kenleigh C. Hobby et al.

* cited by examiner

VIEWING AND PARTICIPATING AT VIRTUALIZED LOCATIONS

CROSS REFERENCE TO RELATED APPLICATIONS

This application is a continuation of U.S. patent application Ser. No. 13/707,594, filed on 6 Dec. 2012. U.S. patent application Ser. No. 13/707,594 claims a priority to and claims the benefit of U.S. Provisional Application No. 61/630,264, filed 6 Dec. 2011. U.S. Provisional Application No. 61/630,264 is hereby incorporated herein by reference. U.S. patent application Ser. No. 13/707,594 is hereby incorporated herein by reference.

TECHNICAL FIELD

Embodiments of the invention relate generally to a virtual presence model. Embodiments of the invention can also relate to a virtual presence model in servers.

BACKGROUND

Spectators (e.g., fans or observers) can watch spectator events on televisions, computers, or other imaging devices from a grandstand view or grandstand perspective. A spectator event can be, for example, any event with an audience such as, for example, speeches, concerts, sporting events, or other types of events. A sporting event can be, by way of example and not by way of limitation, any competitive event such as a football game, a horse race, a car race, a golf tournament, or another sporting event.

Fan interests in any spectator event, such as a sporting event, can be increased if the viewing experience of spectators can be enhanced. Currently, most sport fans view a televised sporting event from the grandstand view, which is a limited two-dimensional view or binocular perspective. By enhancing the viewing experience, fans can have a virtual perspective, first-person perspective, and/or participant-perspective that allow them to experience the heart-pounding excitement, intensity, sounds, and/or speed of a competitive sporting event. This enhanced viewing experience allows the fan to virtually experience the competitive action of a sporting event or other event. Therefore, it would be desirable to provide technologies that can enhance the viewing experience of and captivate the fans. It would also be desirable for a fan to selectively choose the particular event for viewing and/or for the fan to view one event and then selectively view one or more other events.

Conventional technology permits cameras to be mounted on participants in some sporting events. For example, car-mounted cameras allow the fans to periodically view a car race from the perspective of the race car driver. However, conventional technology does not provide a virtual presence or enhanced viewing experience for captivating the spectators.

Based on the above discussion, the current technology is limited in its capabilities and suffers from at least the above constraints and deficiencies.

BRIEF DESCRIPTION OF THE DRAWINGS

Non-limiting and non-exhaustive embodiments of the invention are described with reference to the following figures, wherein like reference numerals may refer to like parts throughout the various views unless otherwise specified. Note a same embodiment of the MVUI may have different reference numerals in the various drawings. Additionally, the left-most digit of a reference number can identify the drawing in which the reference number first appears.

DETAILED DESCRIPTION OF PREFERRED EMBODIMENTS

Figure 1:
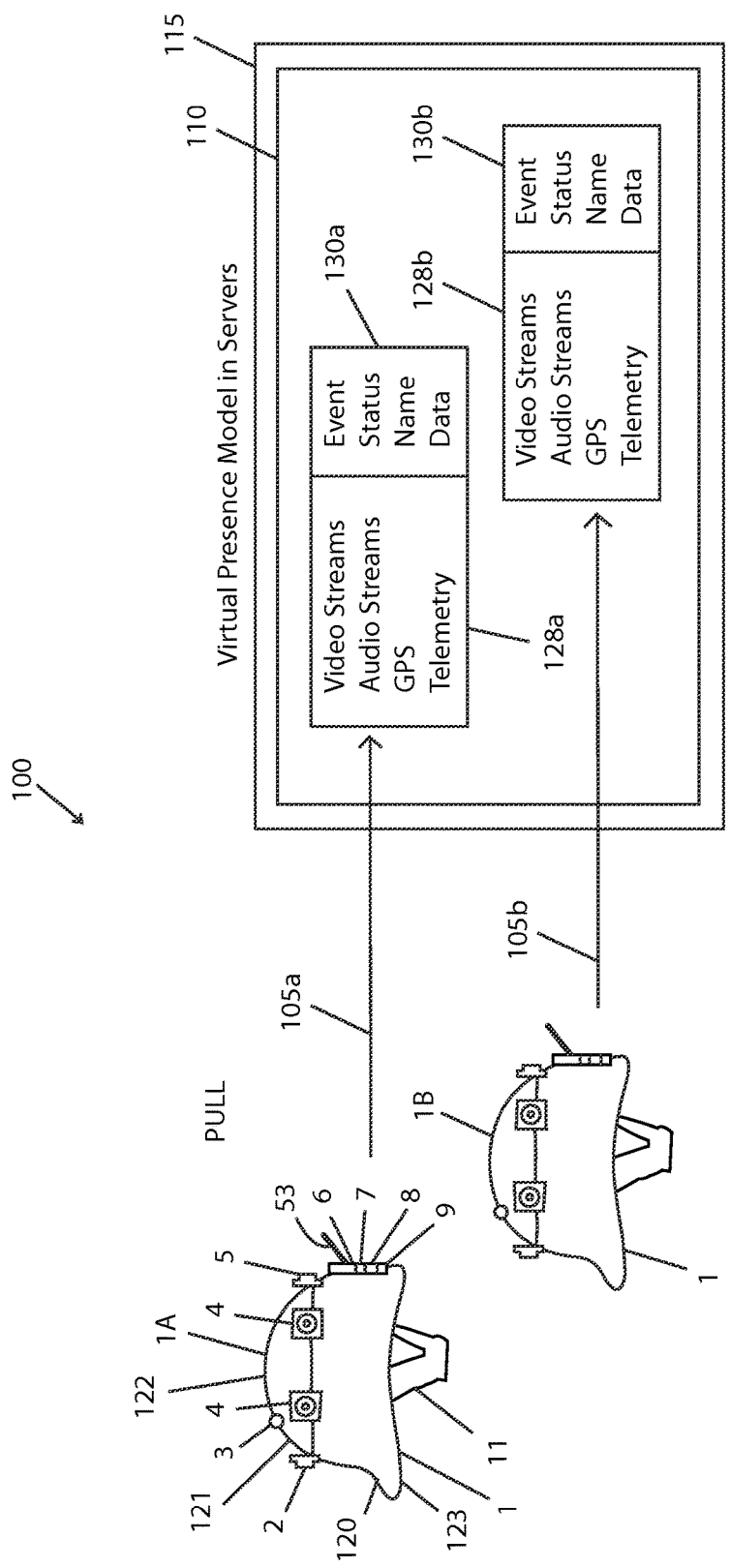
FIG. 1 is a block diagram of a system for a virtual presence model in servers, in accordance with an embodiment of the invention.

In the description herein, numerous specific details are provided, such as examples of components, materials, parts, structures, and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, structures, and/or the like. In other instances, well-known components, materials, parts, structures, methods, or operations are not shown or described in detail to avoid obscuring aspects of embodiments of the invention. Additionally, the figures are representative in nature and their shapes are not intended to illustrate the precise shape or precise size of any element and are not intended to limit the scope of the invention.

Those skilled in the art will understand that when an element or part in the drawings is referred to as being "on" (or "connected" to or "coupled" to or "attached" to) another element, it can be directly on (or attached to) the other element or intervening elements may also be present. Furthermore, relative terms such as "inner", "outer", "upper", "above", "lower", "beneath", and "below", and similar terms, may be used herein to describe a relationship of one element to another element. It is understood that these terms are intended to encompass different orientations of the device in addition to the orientation depicted in the figures.

Although the terms first, second, and the like may be used herein to describe various elements, components, parts, regions, layers, chambers, and/or sections, these elements, components, parts, regions, layers, chambers, and/or sections should not be limited by these terms. These terms are only used to distinguish one element, component, part, region, layer, chamber, or section from another element, component, part, region, layer, chamber, or section. Thus, a first element, component, part, region, layer, chamber, or section discussed below could be termed a second element, component, part, region, layer, chamber, or section without departing from the teachings of the present invention.

Embodiments of the invention are described herein with reference to cross-sectional view illustrations that are schematic illustrations of representative embodiments of the invention. As such, variations from the shapes of the illustrations as a result of, for example, manufacturing techniques and/or tolerances are expected. Embodiments of the invention should not be construed as limited to the particular shapes of the regions or components/parts/elements illustrated herein but are to include deviations in shapes that result, for example, from manufacturing or particular implementations. For example, an element illustrated or described as square or rectangular may typically have rounded or curved features due to normal manufacturing tolerances or due to a particular implementation. Thus, the elements illustrated in the figures are schematic in nature and their shapes are not intended to illustrate the precise shape of an element of a device and are not intended to limit the scope of the invention.

Embodiments of the invention advantageously provide a cutting-edge experience and virtual experience for viewers of spectator events. A spectator event can be any event with an audience such as, by way of example and not by way of limitation, speeches, concerts, sporting events, or other types of events. A sporting event can be, by way of example and not by way of limitation, any competitive event such as a football game, a horse race, a car race, a golf tournament, or another sporting event. Embodiments of the invention can advantageously promote fan interests in any spectator event, such as a sporting event, by enhancing the viewing experience of the spectators.

In particular, embodiments of the invention advantageously provide an important paradigm shift from the conventional binocular perspective (or conventional limited two-dimensional perspective) to a virtual perspective, first-person perspective, and/or participant perspective of a spectator event for a viewer. For example, an embodiment of the invention can be included in a jockey helmet and puts the viewer in the middle of a horse race. As a result, the viewer can experience the race from a jockey's perspective and "can get some turf or dirt in his or her face" during the race. In other embodiments of the invention, the viewer can additionally hear the audio sounds of the game or event. For example, an embodiment of the invention additionally allows the viewer to hear the voices of jockeys and sounds of horses during a horse race, or words of participants in other spectator events. As one specific example of a sporting event, horse racing has been unsuccessful in captivating audiences, especially when compared to other mainstream sports. Conventional technology only allows the fan to have a two-dimensional experience, reminiscent of the binocular era that fails to use technology to improve the fan's connection to the sport. In contrasts, embodiments of the invention allow the viewers to "Ride the Race"™ from the jockey's point of view, and to be able to feel the speed, beauty, and intensity that is the "Sport of Kings." Therefore, embodiments of the invention provide, for example, the fans a real-time "Virtual Presence", meaning the fan can be sitting in his/her couch at home with a computer, mobile telephone with a viewing screen, or other imaging device and can be simultaneously riding along in the Kentucky Derby.

Since embodiments of the invention can significantly enhance the viewing experience, fans will be able to feel the heart-pounding excitement, intensity, sounds, and/or speed of a competitive sporting event. This enhanced viewing experience allows the fan to virtually experience the competitive action of a sporting event or other event, and captivates viewers, leading to increased interests beneficial to sports or other events.

An embodiment of the invention provides a user interface that provides the "virtual presence" aspects. In another embodiment of the invention, a user interface provides a multiple-view (multi-views) where the user can have the ability to select a particular live video stream to view from a target event (e.g., a horse race or another sporting event) and/or to select a particular video stream from video streams that are saved in memory if the target event (e.g., a horse race or another sporting event) to be viewed is not live.

FIG. 1 is a block diagram of a system 100 for a virtual presence model in servers, in accordance with an embodiment of the invention. FIG. 1 shows the Pull to virtual layer model, where data is pulled from the smart helmets 1 into a virtual layer 110 that stores data of events captured by the smart helmets 1. In the example of FIG. 1, data 105a and 105b are pulled from the smart helmets 1A and 1B, respectively, into the virtual layer 110. A server 115 (or other computing device 115) includes a processor that executes any software and/or firmware that provides the functionalities of the virtual layer 110. The one or more software code for providing the functionalities of the virtual layer 110 may be programmed by use of standard programming languages and by use of standard programming techniques known to those skilled in the relevant art(s). Computing elements that are known to those skilled in the relevant art(s) are not shown in the server 115 for purposes of focusing the discussion on embodiments of the invention.

Exemplary Smart Helmet

FIG. 1 is shown as referring to the smart helmets 1 in general and referring to the example smart helmets 1A and 1B in particular. However, the smart helmets 1 may vary from one or more in number or quantity. A smart helmet 1 is, by way of example and not by way of limitation, a smart jockey helmet. While the drawings herein disclose various embodiments of the invention as included in an exemplary smart helmet, it is understood that embodiments of the invention can also be included in a smart non-helmet which are non-protective headgears such as, for example, cowboy hats, sun-hats, or other types of headwear.

In an embodiment of the invention, the smart helmet 1 includes the following elements to be discussed below in additional details: a front facing camera 2; a microphone 3; one or more side facing cameras 4; a rear facing camera 5; a communications subsystem 6 which may include a visible, external aerial or include an aerial that is disposed inside of (or integrated with) the helmet body 120 and is thus out of sight; a control subsystem 7 containing a mobile computer function for digital system or an analog (analogue) signal processing unit for analog signals; a position tracking subsystem 8 for containing a global positioning system (GPS) receiver for tracking the current position of the smart helmet 1; and a telemetry subsystem 9 which, for example, can generate data on the velocity of the helmet 1, data on the angle of the helmet 1 compared to the plane of the land, total time for every fractional distance (e.g., total time for every two furlongs traveled by the helmet 1), and/or other data. The helmet 1 can include optional strap(s) 11 for securing the helmet 1 on the head of the wearer.

In various embodiments of the invention, at least one or more of the above-discussed components in the helmet 1 can be optionally omitted. However, each embodiment of the invention will include the smart helmet body 120, the communications subsystem 6, the control subsystem 7, and at least one camera such as, for example, any type of camera as discussed herein.

The cameras 2, 4, and 5, microphone 3, subsystem 6, subsystem 7, subsystem 8, and/or telemetry subsystem 9 can be securely connected to (or removably connected to) the helmet body 120 by use of snap-on connectors, welding, and/or other suitable connectors known to those skilled in the relevant art(s). Two components that are removably connected means that the two components can be connected together and can be separated from each other.

In an embodiment, the smart helmet 1 is a protective helmet that can provide head safety. By way of example and not by way of limitation, the smart helmet 1 is a jockey helmet or other sport headgear. However, as mentioned above, in another embodiment of the invention the smart helmet 1 is a smart non-helmet which is a non-protective headgear such as, by way of example and not by way of limitation, cowboy hats, sun-hats, or other types of headwear.

In an embodiment of the invention, the number of cameras on the helmet 1 can vary. By way of example and not by way of limitation, the helmet 1 can include only a single camera such as the front facing camera 2 which captures a single wearer point of view, presumably from a forward looking vantage point. When the helmet 1 uses and includes more than one camera, especially four or more cameras, for example, then the helmet 1 can generate a 360 degree immersive-style video for viewing by the user and for providing the viewer an on-field or virtual experience perspective of the spectator event.

In an embodiment of the invention, at least one of the cameras 2, 4, and/or 5 is a camera that can capture 3-dimensional (3D) images. For a 3D camera, the camera lenses could be, for example, stereo lenses to capture 3D images.

In an embodiment of the invention, any of the cameras 2, 4, and 5 can be removably mounted via connectors to the helmet body 120 or can be welded on the helmet body 120. In another embodiment of the invention, any of the cameras 2, 4, and 5 can be embedded in the helmet body 120. By way of example and not by way of limitation, a camera embedded in the helmet body 120 would typically be a lightweight, small-sized camera such as those cameras used (or those similar to cameras used), for example, in medical endoscopy imaging or other imaging technologies.

In an embodiment of the invention, the cameras included with the smart helmets disclosed herein can record high definition images such as, by way of example and not by way of limitation, approximately 1080p resolution. In other embodiments of the invention, the cameras can record alternative lower quality formats such as, by way of example and not by way of limitation, approximately 720p, 480p, or other resolution values, in order to achieve cost saving and/or bandwidth saving requirements as required by a user.

The microphone 3 to record the audio of the surroundings of the smart helmet 1 can also be optionally used to accompany the cameras that capture images and/or record video. However, in other embodiments of the invention, the microphone 3 can be omitted for purposes of achieving lower costs or less complex processing circuitries for the subsystem 6 and/or subsystem 7. In an embodiment of the invention, the microphone 3 can be attached to any suitable position on or inside of the helmet body 120. In FIG. 1, the microphone 3 is shown as attached at the front 121 and towards the top 122 of the helmet 1. However, in other embodiments of the invention, the microphone 3 could equally be placed lower or higher on the helmet 1, on the brim 123 of the helmet 1, or even close to the jockey's mouth to capture his/her utterances more clearly. For example, a microphone extension (not shown) can be optionally attached to the helmet 1 and microphone 3, and this extension can generally extend in the direction of the mouth of the wearer so that the microphone 3 can more clearly capture the utterances and/or voices more clearly.

In another embodiment of the invention, the smart helmet 1 is not limited to a single microphone 3 and instead can include a plurality of microphones. These multiple microphones can be used, by way of example and not by way of limitation, to capture stereo tracks and/or more audio tracks. By way of example and not by way of limitation, the helmet 1 includes multiple microphones formed by the microphone 3 on the helmet body 120 and another microphone attached to the extension.

In an embodiment of the invention, the communication subsystem 6 is the component of the smart helmet 1 that connects the helmet 1 to the rest of the world for communication functions. Thus, the communication subsystem 6 operates on the data 105a and 105b so that the data 105a and 105b are pulled from the smart helmets 1A and 1B, respectively, into the virtual layer 110. The communications subsystem 6 provides the smart helmet 1 with a digital or analog connection to a local base station setup to receive the smart helmet signals. If the communications subsystem 6 has digital transmission capability, then the subsystem 6 can be communicatively linked directly via a communications network that will transmit the smart helmet signals from the subsystem 6 to a destination node that is communicatively coupled to the network. The network could be, by way of example and not by way of limitation, the Internet or another wide-area communications network, a local communications network, a private communications network, and/or another communications network. For digital communications connections, using WiFi/WLAN or a WAN, the communications from the smart helmet 1 will involve Internet Protocol (IP) packets, but the communications subsystem 6 will be an IP addressable node.

Additionally or alternatively, communications subsystem 6 of the smart helmet can transmit the communications via one or more telecommunications networks which can be, for example, a mobile/cellular phone network, a GSM network, a CDMA network, a radio network, and/or the like. Such additional networks or optional networks would allow the smart helmet 1 to send the communications to a mobile or cellular telephone being used by a user. Such networks could also facilitate the smart helmet 1 in sending the communications via the network (e.g., Internet) to the mobile or cellular telephone.

For an analog communications connection, the video, audio, and/or other signals will be transmitted from the subsystem 6 to the destination station by use of available analog transmission frequencies. For example, these analog communication signals can be RF signals of a given frequency such as, e.g., approximately 2.4 GHz or 5.8 GHz.

In an embodiment of the invention, the communications subsystem 6 may include a visible, external aerial or have an aerial that is integrated inside a device itself that also contains the control subsystem 7, or have an aerial that is integrated with the helmet body 120, or have an aerial that is disposed within the interior surface of the helmet body 120. As defined herein, an aerial forms the external packaging (or box) containing the circuits in the subsystem 6.

In an embodiment of the invention, the helmet 1 includes a smart system having the communications subsystem 6 and the control subsystem 7. In another embodiment of the invention, the smart system includes the communications subsystem 6, control subsystem 7, and at least one of the position tracking subsystem 8 and/or telemetry subsystem 9. Other variations in the smart system are possible in other embodiments of the invention.

In one embodiment, the smart system includes an antenna 53 for use in transmitting signals from the smart system. However, in another embodiment of the invention, the antenna 53 is not necessarily visible to the observer and may be integrated with, built into, and/or flush with a packaging attached to the helmet 1 or with the helmet 1.

In an embodiment of the invention, any of the communications subsystem 6, control subsystem 7, position tracking subsystem 8, and/or telemetry subsystem 9 are contained within a packaging which can vary in shape, configuration, and/or placement with respect to the smart helmet body 120. By way of example and not by way of limitation, the packaging can have a box shape (or rectangle shape) as shown in FIG. 1. However, the packaging can also have other shapes and/or configurations. For example, the packaging can have a more flush shape with respect to the helmet body 120.

By way of example and not by way of limitation, the packaging can be coupled to the rear portion of the smart helmet body 120 as shown in FIG. 1. However, the packaging can also be coupled to other portions of the smart helmet body 120 such as, by way of example and not by way of limitation, the front portion 121, the top portion 122, the left side portion of the helmet 1, the right side portion of the helmet 1, and/or other portions of the smart helmet body 120.

In an embodiment of the invention, the control subsystem 7 includes the components for mobile computer functions for digital systems or the analog signal processing unit for analog signals. The control subsystem 7 collects and processes the video, audio, GPS, and/or telemetry data, and the communications subsystem 6 sends these data from the smart helmet 1 to a destination such as, by way of example and not by way of limitation, a local base station or a node. By way of example and not by way of limitation, the control subsystem 7 can format the video, audio, GPS, and/or telemetry data into digital data streams or data packets which the communications subsystem 6 can then stream as digital signals via a network to a node. By way of example and not by way of limitation, the control subsystem 7 can modulate the video, audio, GPS, and/or telemetry data with a carrier wave of a given frequency and the communications subsystem 6 can transmit the modulated signal to a local base station.

In an embodiment of the invention, if the control subsystem 7 includes (or is embodied as) a digital control subsystem, then the digital control subsystem will receive the digital signals from each of the attached devices (e.g., camera 2, microphone 3, cameras 4, camera 5, position tracking subsystem 8, and/or telemetry subsystem 9) and may subsequently alter or multiplex the digital signals before transmission. By way of example and not by way of limitation, examples of such alterations of digital signals includes (1) stitching the various camera-captured video data together to provide a single video stream that emulates a 360 degree video and/or (2) transcoding the video data from the format provided by the cameras to a network transmittable encoding format.

Methods for stitching of multiple camera video signals, as known to those skilled in the relevant art(s), may be used on the digital signals before transmissions of the digital signals by the communications subsystem 6.

By way of example and not by way of limitation, a network transmittable encoding format technique can be MJPEG or YUV raw video transcoded to MPEG4 video packaged in an MPEG-TS stream. Video encoding and transcoding hardware may be included as part of the control subsystem 7.

By way of example and not by way of limitation, multiplexing of signals include sending the video data and telemetry data across the network to the same destination network devices or using the same protocol to send the signals. Multiplexing of the video and audio signals involves the control subsystem 7 combining together these signals into a single media stream. The communications subsystem 6 then transmits this media stream to a destination such as, e.g., a local base station or/and a node or/and a remote device.

In an embodiment of the invention, for a control subsystem 7 that includes (or embodied as) an analog control subsystem, video and audio data may be transmitted directly from the cameras and microphones by the communication subsystem 6 or routed through the control subsystem 7 that converts the analog data (by use of alteration or multiplexing) before transmission.

In an embodiment of the invention, a digital control subsystem can also be used with both digital and analog video and audio devices, depending on the inputs and configuration of a controller in the subsystem 7.

In an embodiment of the invention, the helmet 1 can optionally include a position tracking system 8 which can be, by way of example and not by way of limitation, a GPS receiver for tracking the current position of the smart helmet 1 (i.e., current position data of the smart helmet 1). The GPS signals are received from the GPS tracking system 8 and sent to the control subsystem 7 which, in turn, determines the method for transmitting the GPS signal from the smart helmet 1.

As known to those skilled in the relevant art(s), a GPS receiver is typically a single, small chip (IC) when used in embedded applications. The chip is typically mounted on a board. When the chip is powered by voltage and receives satellite signals, the chip emits a stream of NMEA (usually) encoded position data. In an aspect, the control subsystem 7 is configured to process that position data in various methods. By way of example and not by way of limitation, the control subsystem 7 transmits that position data as part of the data stream. Examples of the chips that can be used in the GPS tracking system 8 include the following products: http://www.micro-modular.com/gps.php?part-MN8010&go-brief or http://www.amazon.co.uk/Channel-Micro-miniature-MN5010HS-GPS-Receiver/dp/B0040C3D76. In an aspect, the connection to the control subsystem 7 is, for example, via a serial connection at a (typically) low baud rate.

In an embodiment of the invention, the helmet 1 can optionally include a telemetry subsystem 9 which is a component for taking additional measurements from the smart helmet 1. In an embodiment, the telemetry subsystem 9 will capture telemetric data that includes velocity information of the smart helmet 1. In another embodiment, the telemetry subsystem 9 is configured with a signal generating system for tracking at least one or some of the following telemetric data: the smart helmet's velocity, acceleration, angles at which the helmet is pitched, total time traveled between fractional distances (e.g., every two furlongs), and/or other information.

In an embodiment of the invention, a number of separate chips (ICs) or/and devices together will collect different telemetric data and the control subsystem 7 polls these devices for the various telemetric data. In another embodiment, the telemetry subsystem 9 includes only a single chip for tracking a particular telemetric data such as, by way of example and not by way of limitation, the velocity of the smart helmet 1. In another embodiment, the telemetry subsystem 9 includes a plurality of chips, where each chip will track a respective telemetric data (e.g., a first chip will track the velocity of the smart helmet 1, while a second chip will track the angles at which the smart helmet 1 is pitched). Other variations in the telemetry subsystem 9 are possible in an embodiment of the invention. An example device that can be used to track the telemetric data is a triple axle accelerometer disclosed in http://www.sparkfun.com/products/9269. This accelerometer is a dumb device that outputs acceleration as a change in voltage across a connecting pin and is thus wired directly into the telemetry subsystem 9.

Those skilled in the relevant art(s) would realize based on the discussion of the embodiments herein that various signal coupling technologies such as, by way of example and not by way of limitation, circuits, links, cables, wiring, electrical traces, wireless links or wireless methods, optical links, other signal coupling technologies, and/or combinations of various signal coupling technologies can be used to couple the signals of one or more elements such as, e.g., camera 2, microphone 3, at least one camera 4, camera 5, subsystem 6, subsystem 7, subsystem 8, and/or subsystem 9.

Exemplary Virtual Layer

In an embodiment of the invention, the virtual layer 110 stores (into one or more memory areas 128a) one or more of the following data that are transmitted by communications subsystem 6: (1) video streams that are captured by any (or all) of the cameras 2, 4, and/or 5; (2) audio streams that are captured by microphone 3; (3) GPS data tracked by the position tracking subsystem 8; and/or (4) telemetric data (telemetry) captured by the telemetry subsystem 9.

In an embodiment of the invention, the virtual layer 110 also stores (into one or more memory areas 130a) one or more of the following identification data that identifies one or more appropriate data in the memory areas 128a. For example, the following identification data are as follows: (1) the event data identifies the type of event for data in the memory areas 128 (e.g., videos for a horse racing card for a given racetrack are identified by a given event data); (2) the status data identifies if an event is being shown live or is a recorded event; (3) the name data identifies the name of an event; and/or (4) the data identification identifies the type of data, such as, for example, video streams data, audio streams data, GPS data, or telemetric data.

In an embodiment of the invention, the data in the memory areas 128a and 130a are associated with data captured by the first smart helmet 1A while the data in the memory areas 128b and 130b are associated with the data captured by the second smart helmet 1B. Additional memory areas can be allocated by the virtual layer 110 to store data captured by other smart helmets (not shown in FIG. 1).

Figure 2:
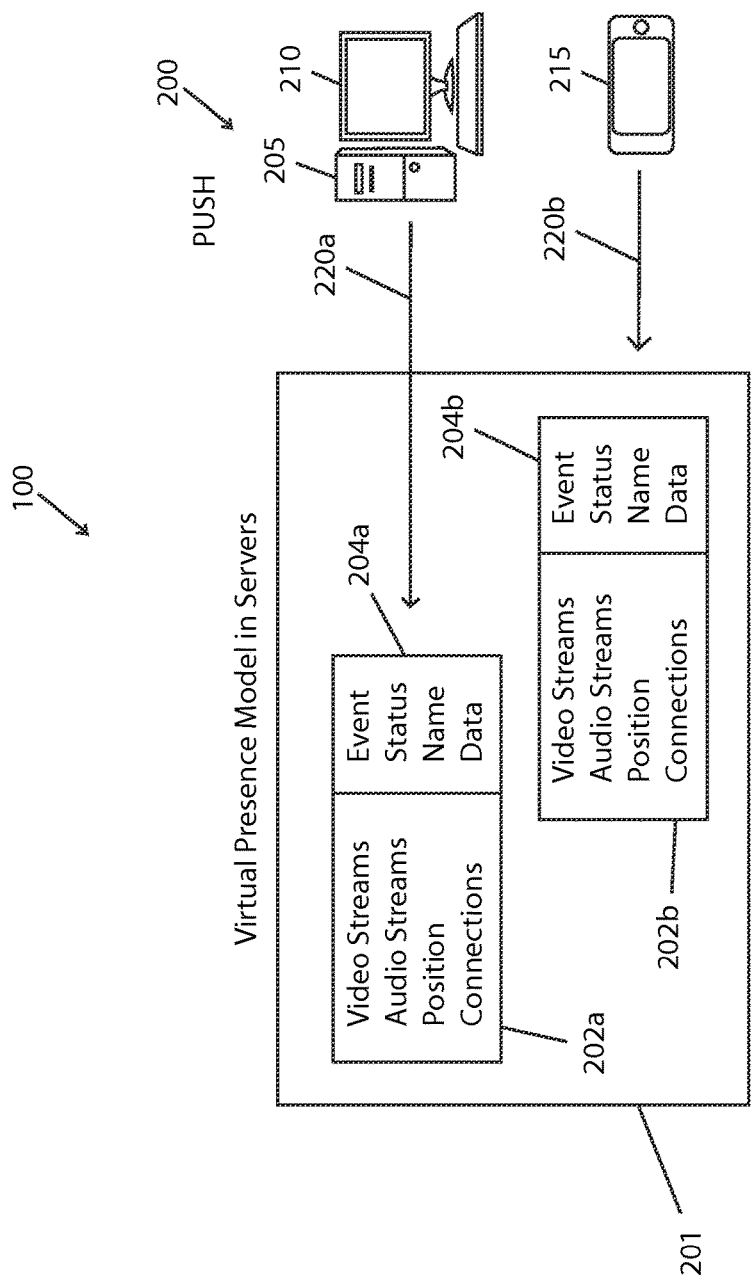
FIG. 2 is another block diagram of a system for a virtual presence model in servers, in accordance with an embodiment of the invention.

FIG. 2 is another block diagram of a system 100 for a virtual presence model in servers, in accordance with an embodiment of the invention. FIG. 2 shows the Push to virtual layer model, where users use multi-view user interface to push data into a virtual layer 201. The users can use a computer 200 (e.g., a desktop 210 with computer drive 205), a cellular phone 215, or another type of computing device. The server 115 (or other computing device 115) (FIG. 1) includes the processor that executes any software and/or firmware that provides the functionalities of the virtual layer 201. In the example of FIG. 2, the devices 200 and 215 will push the data 220a and 220b, respectively.

In an embodiment of the invention, the virtual layer 201 stores (into one or more memory areas 202a) one or more of the following data that are transmitted by the computer 200: (1) video streams; (2) audio streams; (3) position data which indicates the present location of a user of one a device such as devices 200 or 215 in the physical world and their virtual position in the virtual model (i.e., the real world position of the video stream that they are currently watching); and/or (4) connections data which indicates the relationships that the user of a device 200 has with other users, such as, by way of example and not by way of limitation, the user of device 215. The connections data is a set of simple flags that can indicate, by way of example and not by way of limitation, that two users have a "friend" relationship, or "family" relationship, or "works together" relationship, or a "past communications" relationship, or indeed no relationship as represented by the absence of a flag.

In an embodiment of the invention, the virtual layer 201 also stores (into one or more memory areas 204a) one or more of the following identification data that identifies one or more appropriate data in the memory areas 202a: event data, status data, name data, and/or type of data.

In an embodiment of the invention, the data in the memory areas 202a and 204a are associated with data pushed (transmitted) by computer 200, while the data in the memory areas 202b and 204b are associated with the data pushed by the cellular phone 215. Additional memory areas can be allocated by the virtual layer 201 to store data pushed by other computing devices (not shown in FIG. 2).

Figure 3:
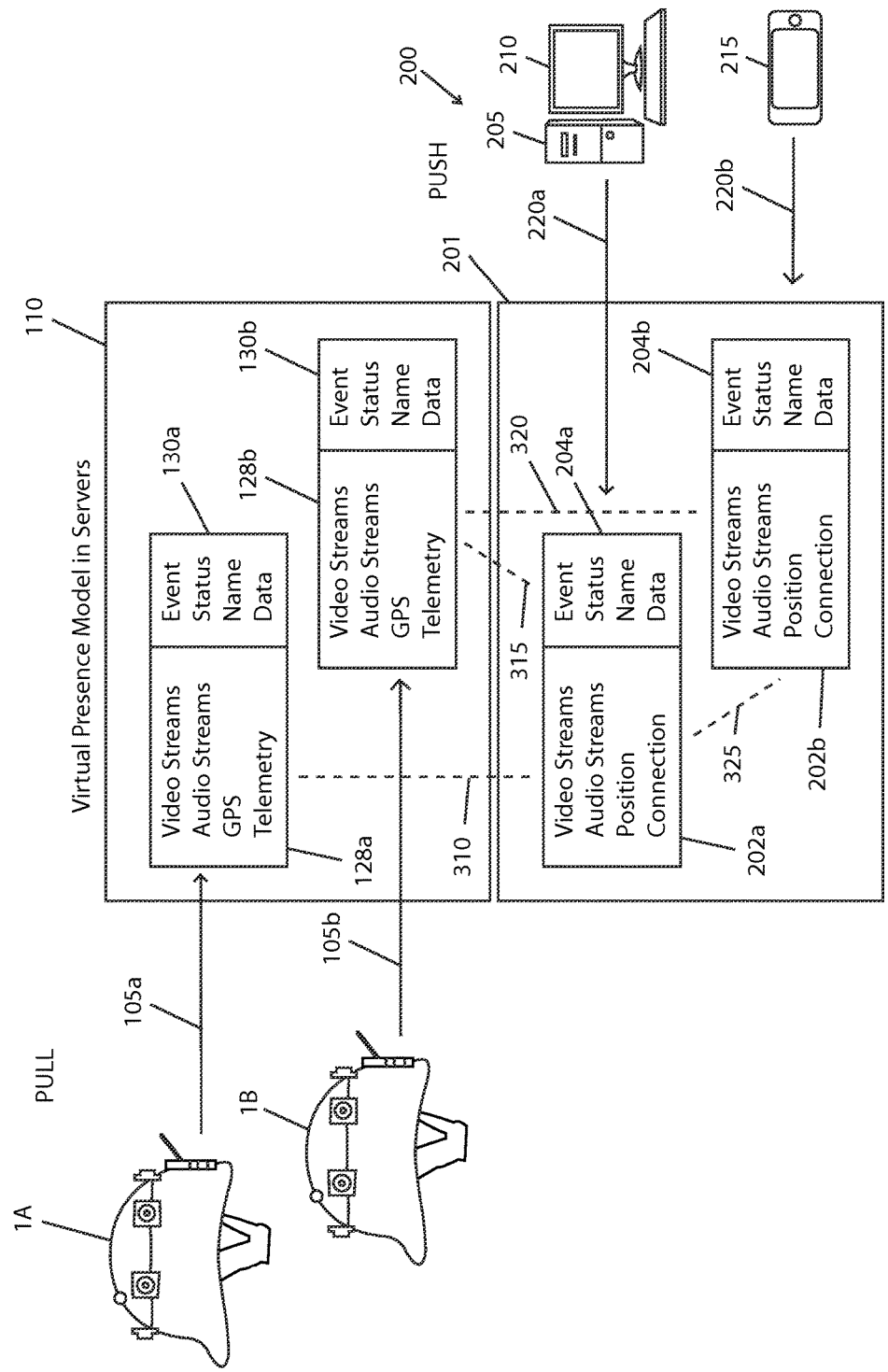
FIG. 3 is another block diagram of a system for a virtual presence model in servers, in accordance with an embodiment of the invention.

FIG. 3 is another block diagram of a system 100 for a virtual presence model in servers, in accordance with an embodiment of the invention. FIG. 3 shows the Push to virtual layer model and pull to the virtual layer model as previously discussed above. In the virtual layer, data is shared between the components that represent the physical world in the virtual layer. Shared data is then sent back out to end users as appropriate (e.g., video is taken from a participant (jockey) and sent to an attendee (end-user)). For example, the memory areas 128a and 202a share (310) data, the memory areas 128b and 202a share (315) data, the memory areas 128b and 202b share (320) data, and the memory areas 202a and 202b share (325) data.

Virtual Presence

The pulling of information from the physical world into a virtual world, as shown in FIG. 1, takes video, audio and telemetry data from points-of-presence (POPS) in the physical world and allows them to be played back through a multi-view user interface in various embodiments of the invention (MVUI). Telemetry and other location specific data can be related descriptively or visually, including descriptions or iconography, for example, for temperature readings, humidity, brightness, weather conditions, and so forth.

The pushing of the presence of the user from his/her location in the physical world into the virtual world involves the following. A user can be said to be "virtually attending" an event if he/she is "present" in the artificially created connections between event attendees and participants. For example, the VSF event catalog (a list of all the physical events being captured by a Virtual Server Fabric or VSF, which is a plurality of distributed servers) stores those who are participating in the event (participants; e.g., jockeys), those that are physically attending an event (physical attendees; e.g., viewers in the stands at a race track) and those that are virtually attending an event (virtual attendees; i.e., viewers watching from home on their computers or smart phones or other computing devices). The VSF tracks where each type of person is and how he/she can be updated, if possible, and what alerts need to be sent out to other users of the platform.

Given these two models, the VSF constructs a virtual layer on top of the physical world that parallels the events of the physical world. Using head-mounted (or helmet-mounted) cameras, telemetry devices, GPS coordination systems, for example, the physical world is pulled into the virtual. Through the MVUI, the users' presence is then pushed into the same virtual layer and the combined result is a system of virtual presence on top of real world events.

The virtual presence model used to create the virtual layer uses a combination of shared memory areas and active processes. All data and virtual world state is stored in the shared memory areas whereas activities and changes to the data is coded in the active processes. Active processes, by way of example and not by way of limitation, can implement such features as video streaming, audio streaming, sending user messages, updating current user positions, updating user connections and relationships, manage user avatars (icons), communicate with other active processes in the VSF to ensure that the VSF works as a fault tolerant cloud, provide load balancing of services and implement all services. Each active process will have access to and be able to change a part of the VSF's overall shared memory areas. Shared memory areas can also be stored to disk or a database for future use or to prevent data loss in the event of a server, service or active process crash.

The advantage of active processes is that the provide a means to have program code standing by and waiting to execute based on incoming data or media streams without having to rely on fresh shared memory area and computing resources allocation on each new communication.

Figure 4:
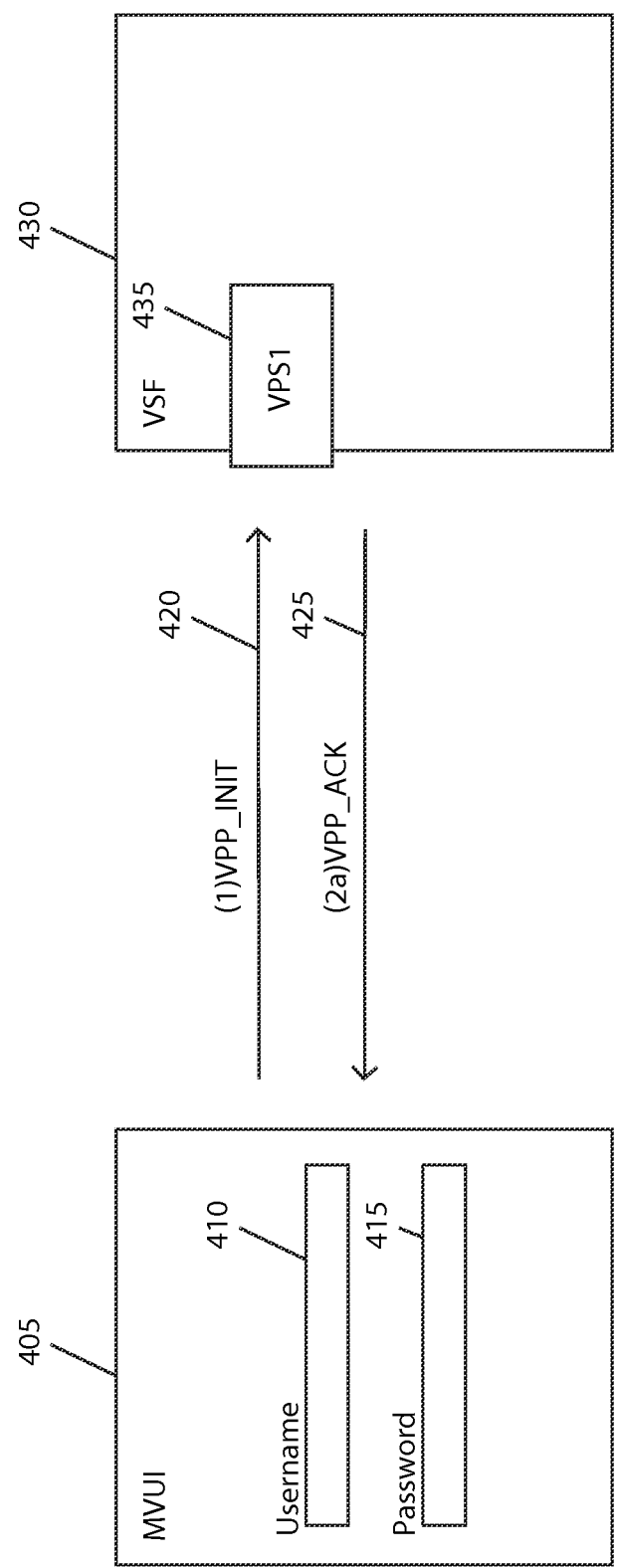
FIG. 4 is a block diagram of a multi-view user interface (MVUI) connecting to a virtual server fabric (VSF), in accordance with an embodiment of the invention.

FIG. 4 is a block diagram of a multi-view user interface (MVUI) 405 connecting to a virtual server fabric (VSF) 430, in accordance with an embodiment of the invention. As an example, the VSF is a cloud computing platform.

In an embodiment of the invention, the user can input his/her username in the field 410 and password in the field 415 in an MVUI 405.

The MVUI 405 connects to the VSF 430 by sending a VPP_INIT message 420 to a virtual presence service (VPS) 435 running in the VSF 430. A VPS 435 will have been selected via DNS (e.g., round-robin lookup, normal behavior for computers, not a part of the system). A VPS 435 will respond with a VPP_ACK message 425 if the VPS 435 can handle the load of another user.

A MVUI 405 is the access point and enabling technology for a virtual presence experience provided by an embodiment of the invention. As an example, a MVUI 905 could be seen as a form of computer graphical user interface (GUI) that lets a user simultaneously view more than one video stream from an event while also being able to dynamically select one or more of those streams for enlargement. As an event progresses, the user can take advantage of particular points-of-view as expressed by a video stream. However, the MVUI 405 also offers more capabilities such as connection to other users based on "presence" at virtual or physical locations or the ability to browse data about aspects of events being attended. Furthermore, the MVUI 405 pushes the actions of a user into the virtual world (virtual layer 201) to make his/her presence in the virtual world to be known to others.

As such, video streams viewed by the MVUI 405 are usually related in some manner, such as all being streamed from the same location or all being related to the same event. Thusly, they work together to provide a user with the ability to jump from place to place all at the same event while allowing others to be aware of what the users virtually near them (not physically near) are doing.

Figure 5:
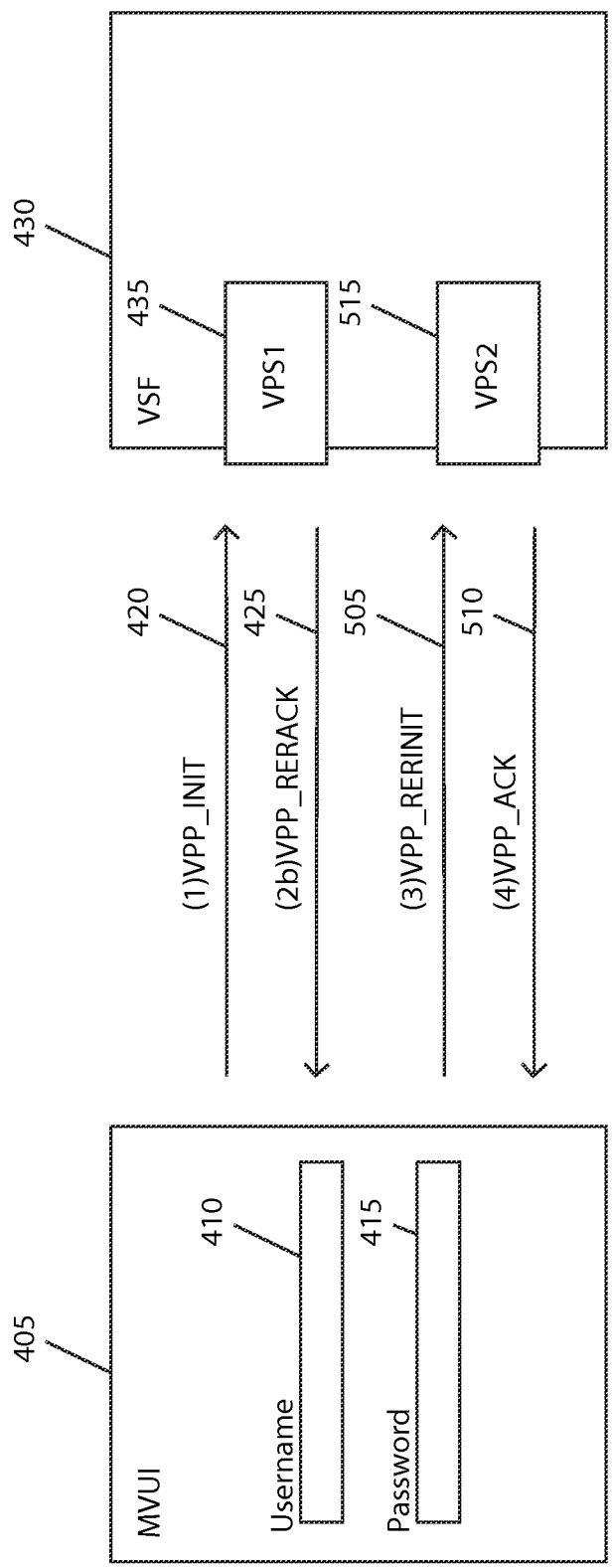
FIG. 5 is a block diagram of an MVUI connecting to a VSF with redirect from the VPS to another virtual presence service, in accordance with an embodiment of the invention.

FIG. 5 is a block diagram of an MVUI 405 connecting to a VSF 430 with redirect from the VPS 435 to another virtual presence service 515, in accordance with an embodiment of the invention. The VPS 435 will respond to a VPP_INIT message 420 with a VPP_RERACK message 426 if it cannot handle the load of another user. The MVUI 405 then uses the data provided in the VPP_RERACK message 426 to connect to an alternative VPS 515. The MVUI 405 will connect to the alternative VPS 515 using a VPP_RERINIT message 505 with the RERACK flag set. The alternative VPS 515 will similarly respond with either a VPP_ACK 510 or VPP_RERACK 426.

Figure 6:
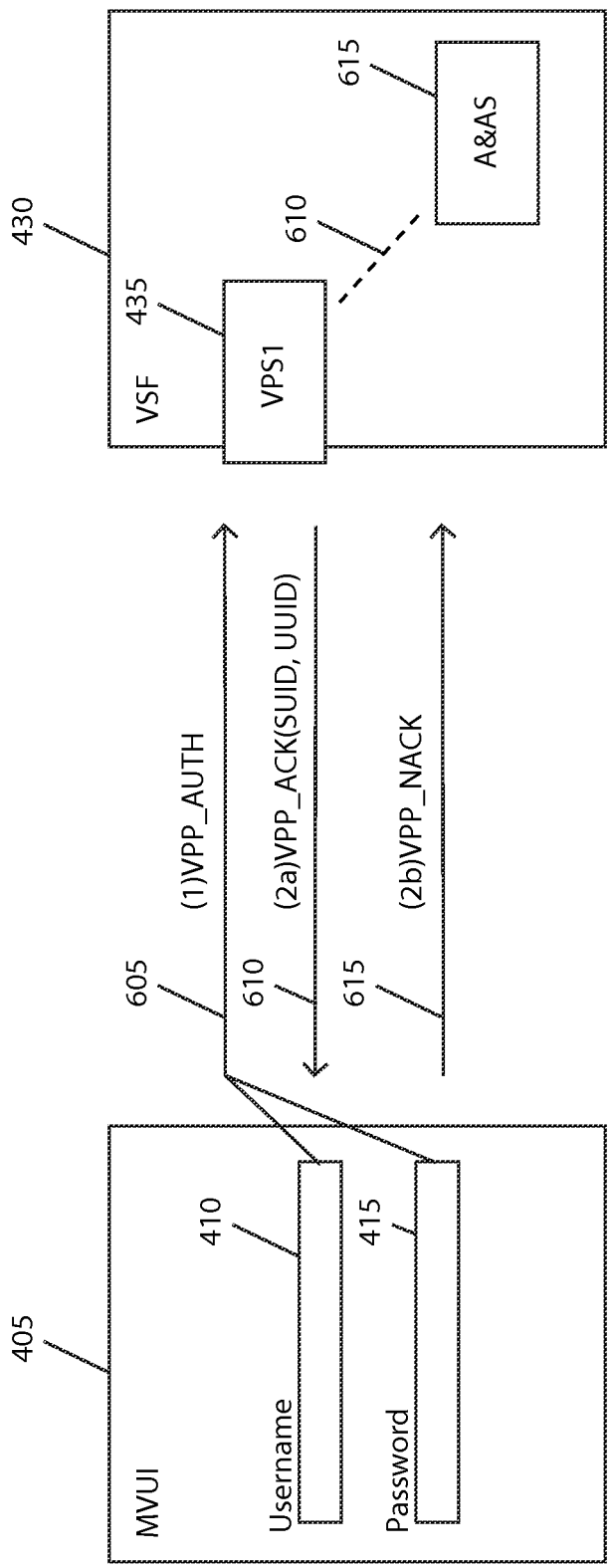
FIG. 6 is a block diagram of an MVUI connecting to a VSF upon authentication and authorization of the MVUI, in accordance with an embodiment of the invention.

FIG. 6 is a block diagram of an MVUI 405 connecting to a VSF 430 upon authentication and authorization of the MVUI 405, in accordance with an embodiment of the invention. The MVUI 405 collects a username and password pair from the user and sends the pair to the VPS as a VPP_AUTH message 605. The VPS 435 forwards (610) the pair 605 to the A&AS (the Authentication and Authorization Service) 615 of the VSF 430. The A&AS 615 replies to the VPS 435 with an SUID (session unique ID) and UID (User ID) pair if the username and password pair 605 are valid. The VPS 435 replies to the MVUI 405 with a VPP_ACK message 610 that includes the SUID and UID pair. If the username and password pair 605 are invalid, the A&AS 615 will not give the VPS 435 an SUID or a UID and the VPS 435 will reply to the MVUI 405 with a VPP_NACK message 615. ? that does not contain either an SUID or a UID. The VPS 435 stores the SUID as a valid session key for future user access.

Figure 7:
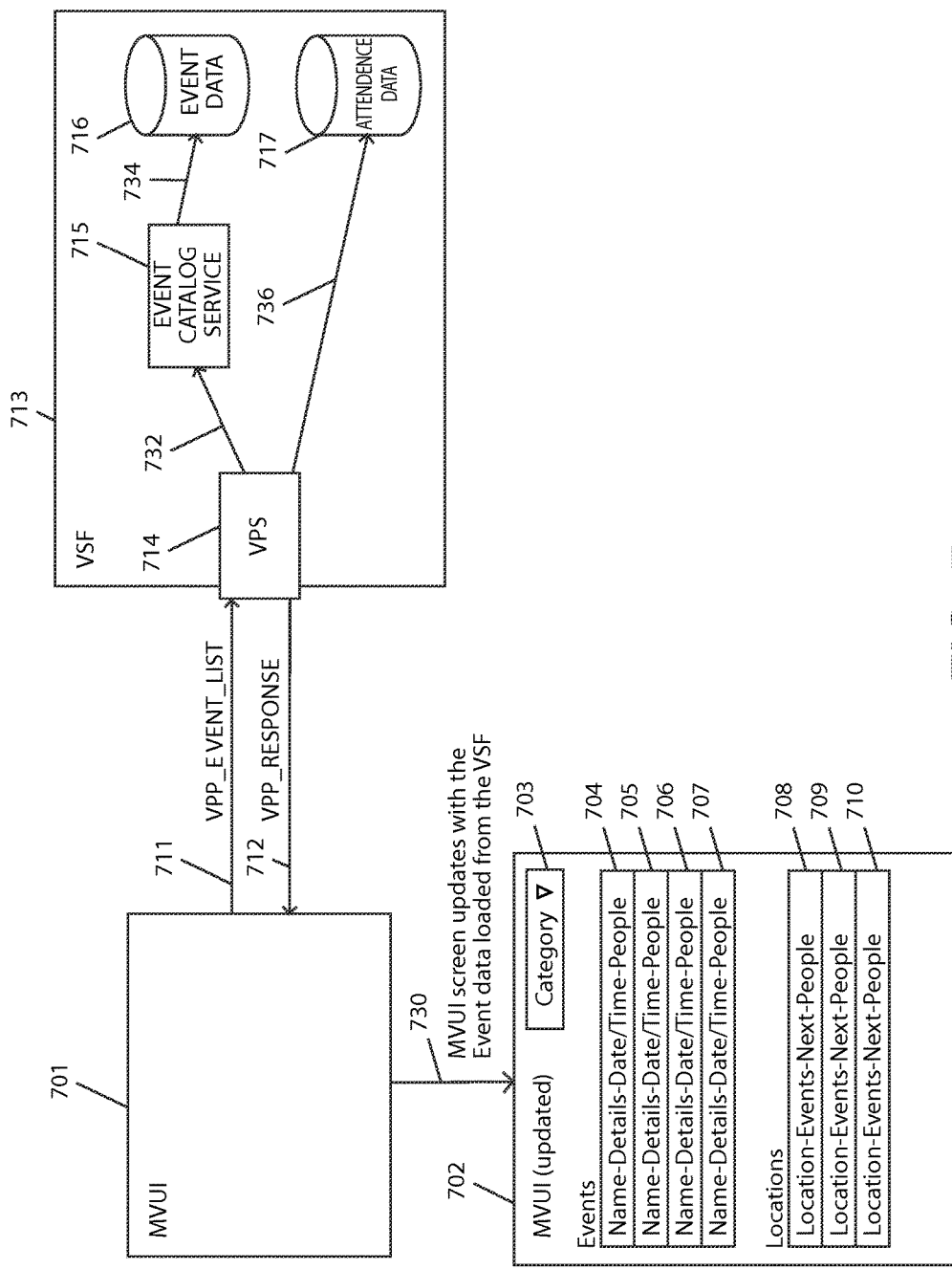
FIG. 7 is a block diagram of a an MVUI requesting event related data from a VPS in a VSF, receiving a reply containing event data and updating its display as appropriate, in accordance with an embodiment of the invention.

FIG. 7 is a block diagram of an events list in an MVUI 701, in accordance with an embodiment of the invention. After the user logs in, the MVUI (701) obtains a list of upcoming events and their locations from the VSF (713). To do this, the MVUI (701) sends an event list message (711) to the VPS (714) service running in the VSF (713). The VPS (714) will in turn send a message (732) to the Event Catalog Service (715) which is the service that manages all the information about events, participants, attendees, and locations. The Event Catalog Service (715) will query (734) its event data (716) to obtain event data for currently on-going events and upcoming events.

Once the event data is ready, it is returned to the VPS (714) which will then query (736) the attendance data (717) to find the attendees currently at on-going events. The data is then all packaged by the VPS (714) in a VPP_RESPONSE message (712) and returned to the MVUI (701). On receipt of the response message (712), the MVUI (701) will update its screen to display the received data. Events will be listed together (704, 705, 706, 707) and locations (708, 709, 710). An event data can show, for example, the event name, event details, event date and time, and people attending the event. A Location data can show, for example, the location, the event(s) in the location, the next event in the location, and people attending the event.

A filter for selecting the type of event categories to show (703) can be used in the updated view 702 (of MVUI 701) to send new event list messages (711) to the VPS (714) for updated but filtered events. A user selecting an event from the event list will change the MVUI (701) display to a three-way split such as, for example, the three-way split shown in MVUI layout 801.

Figure 8:
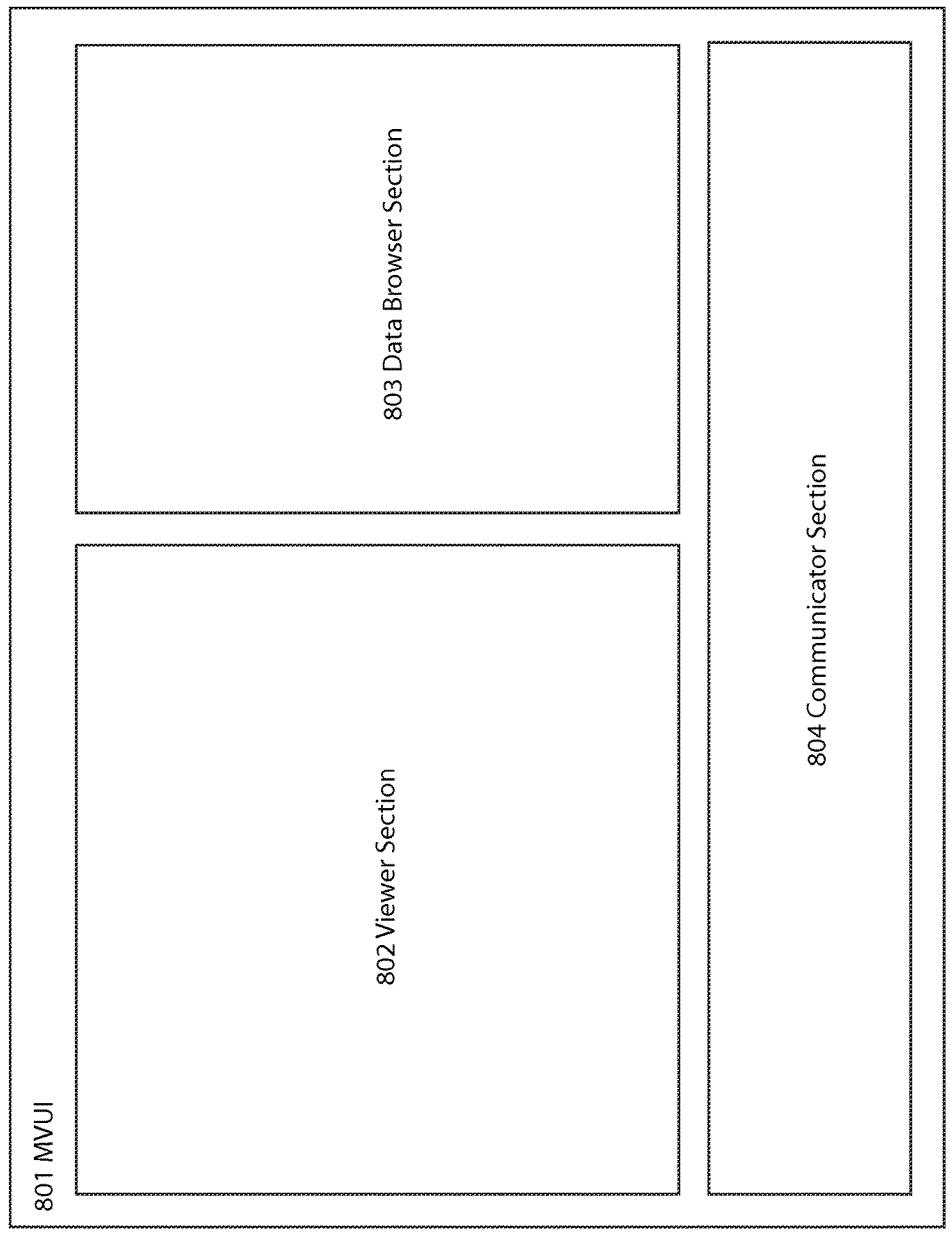
FIG. 8 is a block diagram of a layout in an MVUI, in accordance with an embodiment of the invention.

FIG. 8 is a block diagram of a layout in an MVUI 801, in accordance with an embodiment of the invention. The MVUI (801) is typically split into three separate components. The viewer section (802) is used to show streaming videos of the currently selected event. The data browser section (803) is used to view data either related to the currently selected event or other events. The communicator section (804) is used to communicate with other attendees at an event or the user's friends.

Figure 9:
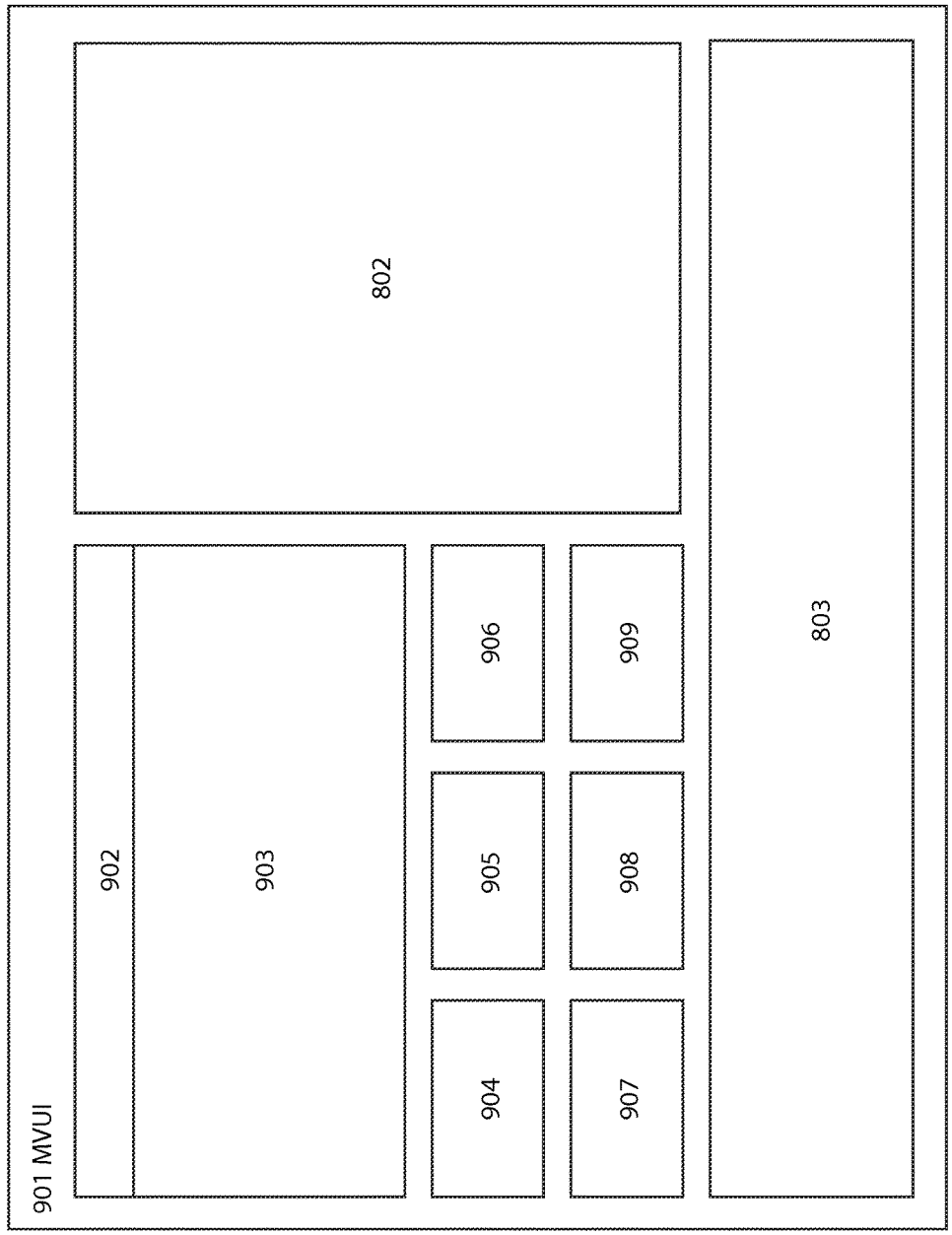
FIG. 9 is a block diagram of a layout and viewer in an MVUI, in accordance with an embodiment of the invention.

FIG. 9 is a block diagram of a layout and viewer in an MVUI (901), in accordance with an embodiment of the invention. An MVUI (901) has a viewer component that displays video streams (802 from FIG. 8). Typically, at the top of the viewer component is an area (902) reserved for status notices and filters (as needed). A main video stream (903) is displayed with a number of smaller videos (904, 905, 906, 907, 908, 909) shown adjacent to the stream 903. Selecting any of the smaller videos (904-909) will expand that video and move it to the main video stream area (903).

Figure 10:
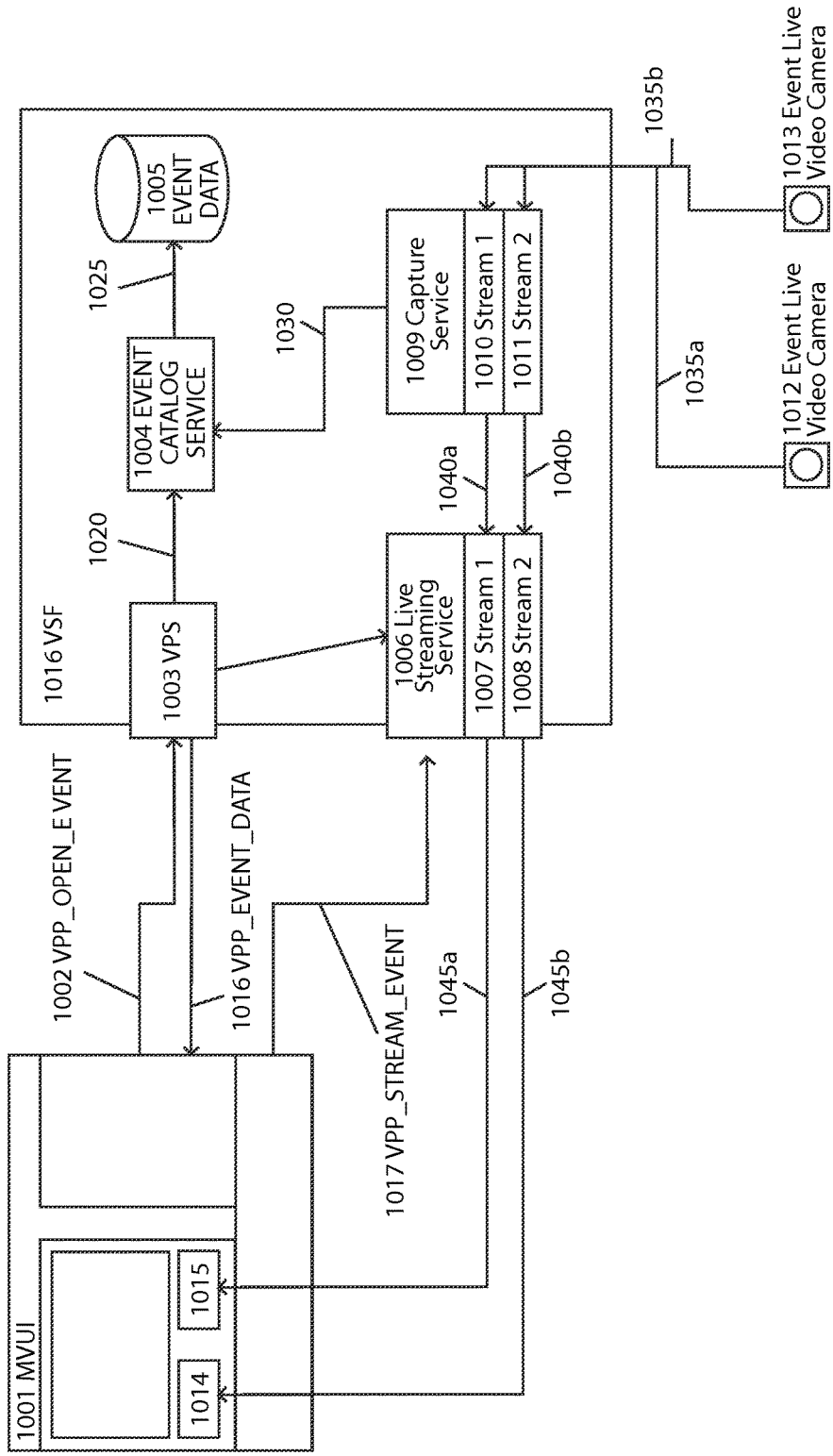
FIG. 10 is a block diagram of video stream to an MVUI, in accordance with an embodiment of the invention.

FIG. 10 is a block diagram of video streaming to an MVUI (1001), in accordance with an embodiment of the invention. Event video streams are captured by one or more live video cameras (1012, 1013) at the location of the event. For example, the cameras (1012, 1013) can be mounted to or coupled to the smart helmets 1 (FIG. 1). The video streams are streamed into the VSF (1016) via the Capture Service (1009) where each incoming stream will be given its own processing resources, such as resource (1010) for the live stream coming from camera (1013) and resource (1011) for the live stream coming from camera (1012), where each resource (1010, 1011) may transcode or convert the incoming video or audio streams as required for later use, as have been similarly discussed above. Information on the details of the incoming streams 1035a and 1035b as sent to one of appropriate resources (1010, 1011) will be sent (1030) to the Event Catalog Service (1004) for storage in the Event Database (1005).

For an MVUI (1001) to display the videos, the MVUI (1001) needs to be connected to the VSF (1016) and send a VPP_OPEN_EVENT message (1002) to the VPS (1003). The VPS (1003) in turn obtains a list of the available video streams for the event from the event catalog service (1004) which in turn pulls the data from the its database (1005). The event stream information is returned to the MVUI (1001) as a VPP_EVENT_DATA message (1016). The VPP_EVENT_DATA message (1016) may also contain meta-information about the event such as data related to the participants and attendees.

When the MVUI (1001) determines which streams are relevant to the currently selected event, the MVUI 1001 can then connect to the Live Streaming Service (1006) using the credentials that it received from the VPS (1003) during the login process. The MVUI (1001) will inform the Live Streaming Service (1006) which streams to send to the MVUI (1001) by using a VPP_STREAM_EVENT message (1017). The Live Streaming Service (1006) will obtain the live, incoming stream data from the Capture Service (1009), assign management processes (1007, 1008) to the data (now 1040a and 1040b) and stream the data to the video display components (1014, 1015) in the MVUI (1001). Suitable data streaming techniques known to those skilled in the relevant art(s) may be used in the live streaming operations discussed herein.

Figure 11:
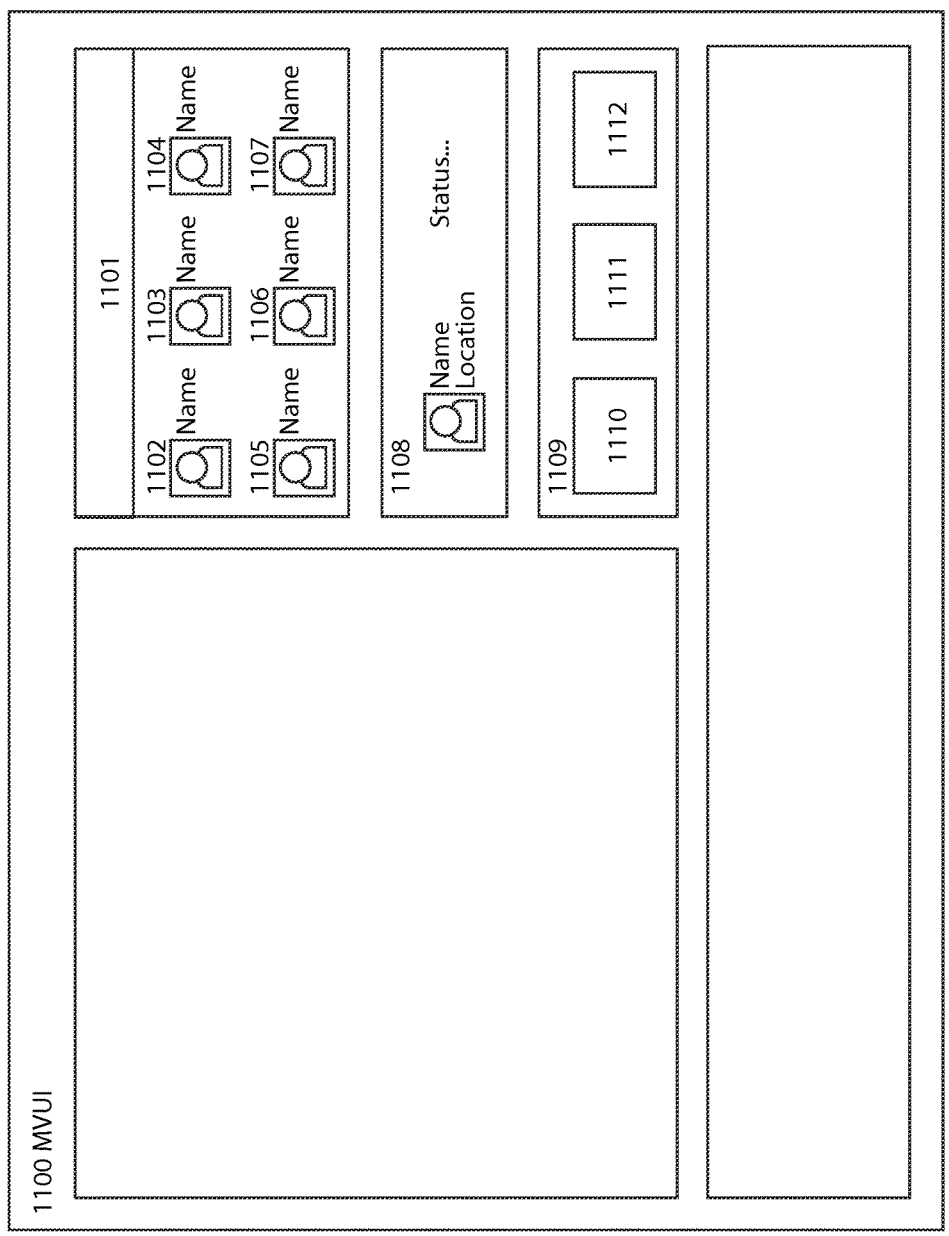
FIG. 11 is a block diagram of a layout and data browser in an MVUI, in accordance with an embodiment of the invention.

FIG. 11 is a block diagram of a layout and data browser in an MVUI (1100), in accordance with an embodiment of the invention. The MVUI (1100) will receive regular updates of data about the on-going event that the user is virtually attending. To access this data, the MVUI (1100) has a section of its user interface devoted to data browsing. The data browser (802) can display such information as a list of attendees at the event (1102 to 1107) showing, for example, at least one of the following: an avatar or photo image of the attendees, a list of participants, a list of friends, a list of all the user's friends (not just those at the currently selected event), specific details about a selected person (1108) (such as, for example, name of selected person, location, and/or status) whether they are a participant or an attendee, event statistics (1101), or video feeds from other events (1110, 1111, 1112) shown in the "Other events" sub-section (1109).

In an embodiment of the invention, most items displayed in the data browser should be selectable by the user which brings up more data.

Figure 12:
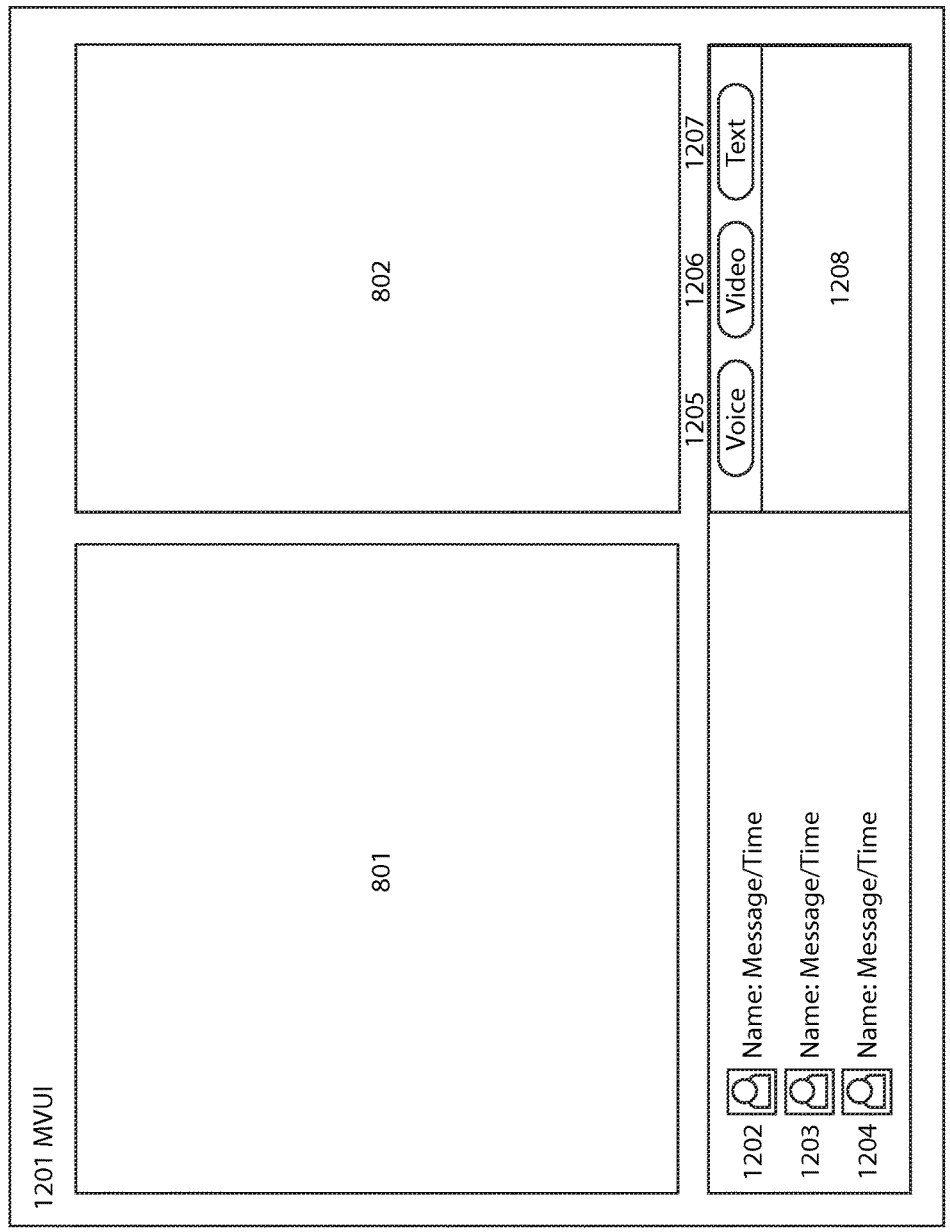
FIG. 12 is a block diagram of a layout and communicator in an MVUI, in accordance with an embodiment of the invention.

FIG. 12 is a block diagram of a layout and communicator in an MVUI (1201), in accordance with an embodiment of the invention. The third section of the MVUI (1201) is the communicator section which lets the user communicate with other users by text, voice, and/or video. To enable voice communication, the user pushes the voice button (1205), pushes the video button (1206) to enable video or pushes the text button (1207) to send an instant text message. Text messages can be entered by the user in the reserved text entry area (1208). Incoming text messages from other users of the system will be displayed as a list of messages (1202, 1203, 1204) with some details including, for example, the message text itself, the name of the sender, and/or the time that the message was sent.

Therefore, one or more embodiments of the invention as described herein can provide one or more of the following functionalities.

An embodiment of the invention has video streaming capability and can allow a user to select which video to watch as the large, central video with some statistics and data on side portions of the user interface.

An MVUI described above in an embodiment of the invention can perform at least one of the following functions, with the order of listing not indicative of importance.

Select viewable events from an event catalog of current (live) and pre-recorded events.

Connect to a VSF cloud computing platform.

Authenticate and authorize users on behalf of the VSF.

View multiple, synchronized videos from an event in parallel; i.e., all video streams are displaying at the same point in time but from a different point-of-view.

View how many other people are virtually attending the event.

View which of the friends of a user are at an event.

Send text-based instant messages to the user's friends of the user at the event.

Send text-based instant messages to everybody at the event (a text-shout: though they may not want to read them).

Send instant voice messages to the user's friends at the event.

Send instant video messages to the user's friends at the event.

Browse jockey profile data and competition statistics or other information.

Browse horse profile data, competition statistics, and lineage or other information.

Browse participant, physical attendee and virtual attendee public data.

A user with a copy of the MVUI software (either on their desktop, a web page via Flash, a web page via HTML/JavaScript, or a mobile computing platform such as a smart phone or tablet computer, for example), is typically required to first sign-in. The MVUI takes the user's username and password and sends them to an embodiment of the Server Fabric (VSF) for authentication. The VSF will either approve or reject the log-in.

On approval, the VSF will log the sign-in and return a special user identifier (UserID) that can be used to represent the user during future communications. The UserID may be the same each time the user signs in and creates a session, or it may be different for each session.

The user does not need to be aware of the UserID. On rejection, the VSF will log the failed sign-in, logging it against the user's details if the username is correct, and the MVUI will ask the user to try logging in again.

After successfully logging in, the user will be able to search the available events that are either currently taking place (live) or have already occurred. The MVUI can connect to a VSF and obtain a list of available events or search the event catalog in the VSF, based on a user entered search query. The user can then select one of the events from the list presented by the MVUI.

On selection of an event, the MVUI will inform the VSF which event has been selected. The VSF will then update the MVUI with the number of streams related to the selected event plus any stream meta-information that the VSF may have. Stream meta-information can include, for example, the video and audio formats (codecs used) of the stream, the type of the stream, the fixed or mobile nature of the stream, device information used to capture the stream, the start time of the stream, the resolution of the stream, the GPS coordinates of the capturing device and so forth. The MVUI can ignore any meta-information that it is not interested in. With the data loaded, the MVUI can prepare its user interface components, such as determining the space needed on the screen for video playback of each of the streams involved in the event.

When ready, the MVUI will request the actual video and audio streams from the VSF. Typically, this will be all or a subset of the "primary" streams of an event. The primary streams of an event are those that are directly related to the event; for example, a primary stream includes the streams coming from the jockey cams during a horse race. The MVUI also prepares the UI to allow for selection of secondary stream types, such as cameras at fixed locations in or around a horse track.

Video streams are displayed as either "active" streams or "passive" streams. A typical layout in the user interface will have active streams displayed at a much higher resolution than passive streams. An example would be at a race event where each jockey has a streaming camera mounted on their helmets and the MVUI will be displaying all the incoming jockey video streams on a single screen. At any point, selecting one of the jockey's video streams would make that stream "active" which has the effect of enlarging the active stream and moving the video stream so that it occupies a central position on the screen. The remaining video streams, still in passive mode, would be displayed organized together below the active stream.

Selecting a passive stream and activating it would have the effect of swapping the newly selected stream for the originally active stream's place and returning the latter to its place in the passive stream area. The active stream also plays a role in the virtual presence model as it indicates which point in the virtual space that the user is locating themselves; that is, the user's virtual world location is said to be the same as the virtual world location of the current active stream.

Thus there is a certain amount of interactivity available to the user and their choice of stream to view. To further enhance this interactivity, alternative layouts can be chosen where more than one stream can be active at a given time. In such cases, selecting a second active stream will enlarge it and also move it to a central position beside the current active stream. The result is having two large, active streams being displayed side-by-side. The user, from the virtual world model perspective, is also considered to be in both virtual places at the same time. An embodiment of the MVUI can also have picture-on-picture capability that are known to those skilled in the relevant art(s).

Other alternative layouts in an embodiment of the invention include automated modes where the active streams are shown based on critical occurrences at an event. For example, given a horse racing event with streamed video from jockey cams, the system can be setup to display the first three horses in the race as the active streams. Thus the three active streams will automatically change during the race.

Another alternative in an embodiment of the invention is to include betting information in the display alongside the streams coming from a sports event.

The MVUI also has access to non-stream data. That is, event related data that does not directly pertain to the stream data, can also be maintained by the VSF for consumption by users. One such example is for horse racing where the VSF can track, e.g., historical race, jockey information and/or blood-line information. At any point during an event (including before and after an actual race), users will be able to access statistical, historical, and/or other information on both jockeys and the horses.

Figure 13:
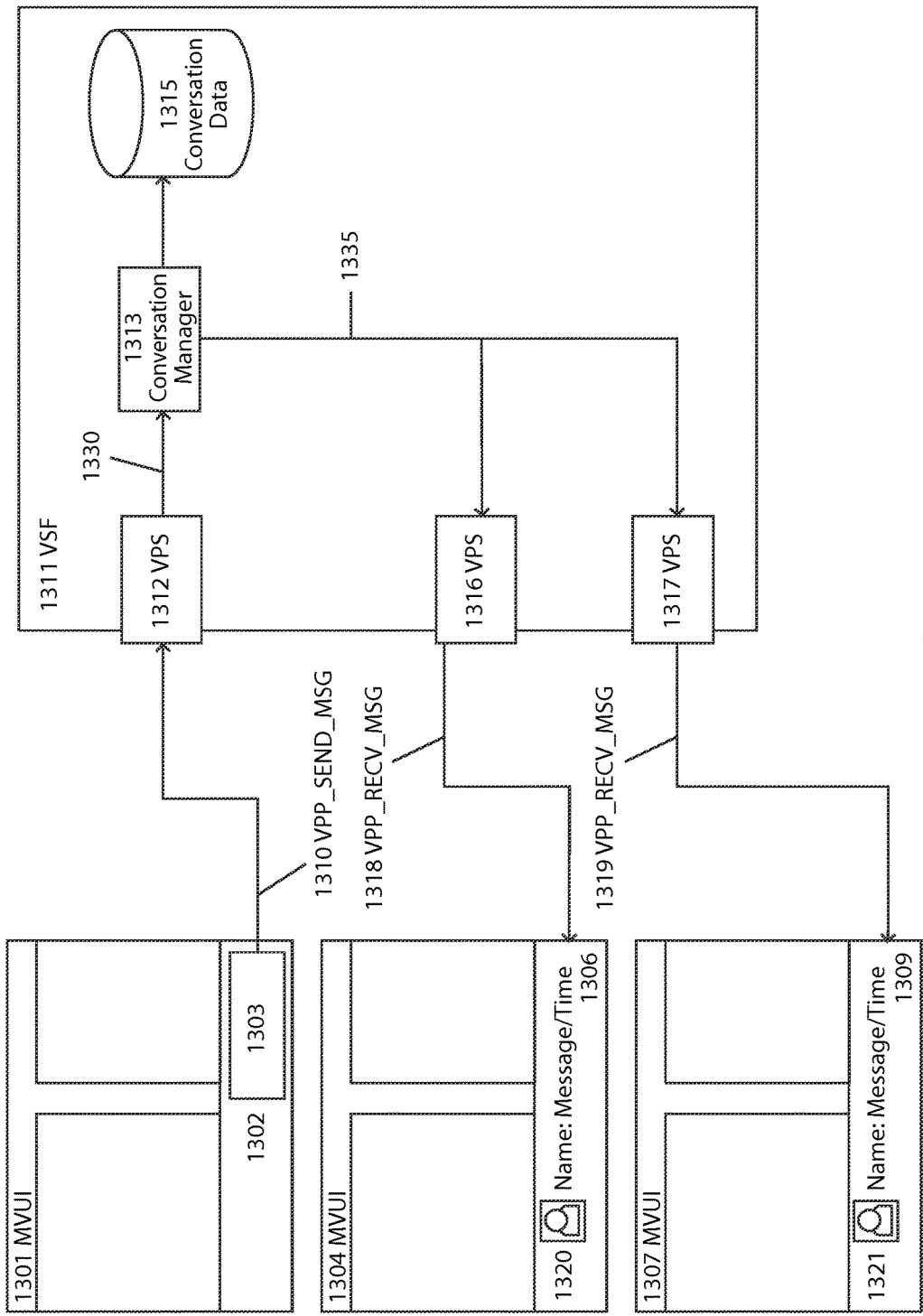
FIG. 13 is a block diagram of a communicator text transport in an MVUI, in accordance with an embodiment of the invention.

FIG. 13 is a block diagram of a communicator text transport in an MVUI, in accordance with an embodiment of the invention. Instant text message distribution by the VSF (1311) is handled by one or more VPS instances (1312, 1316, 1317). A user wishing to use their MVUI (1301) to send a message will first enter the text in the text entry box (1303) of the MVUI's (1301) communicator section (1302) of the UI. The MVUI (1301) will then send the text as a VPP SEND MSG (1310). The MVUI (1301) may send the text message as one block of text after the user has done a key action (such as pressing the enter key or clicking on a send button) or it may continuously send messages to broadcast each update of the message as it is typed.

The VPS (1312) then forwards (1330) the incoming message (1310) and its contents to the Conversation Manager (1313), a service which maintains a list of all the users attending each event and whether they are participating in communications or not. The Conversation Manager (1313) uses a Conversation Database (1315) to store each incoming message for future use and then forwards (1335) the message to each attendee via their VPS connections (e.g., 1316 and 1317) which will send VPP_RECV_MSG messages (1318, 1319) to their users' MVUIs (1304, 1307), respectively. Each received message will be displayed in the receiving MVUI's (1304, 1307) communicator (1306, 1309) as a message with suitable avatar (1320, 1321). The Conversation Manager (1313) does not send incoming messages back to the originating MVUI (MVUI 1301 in this case).

Figure 14:
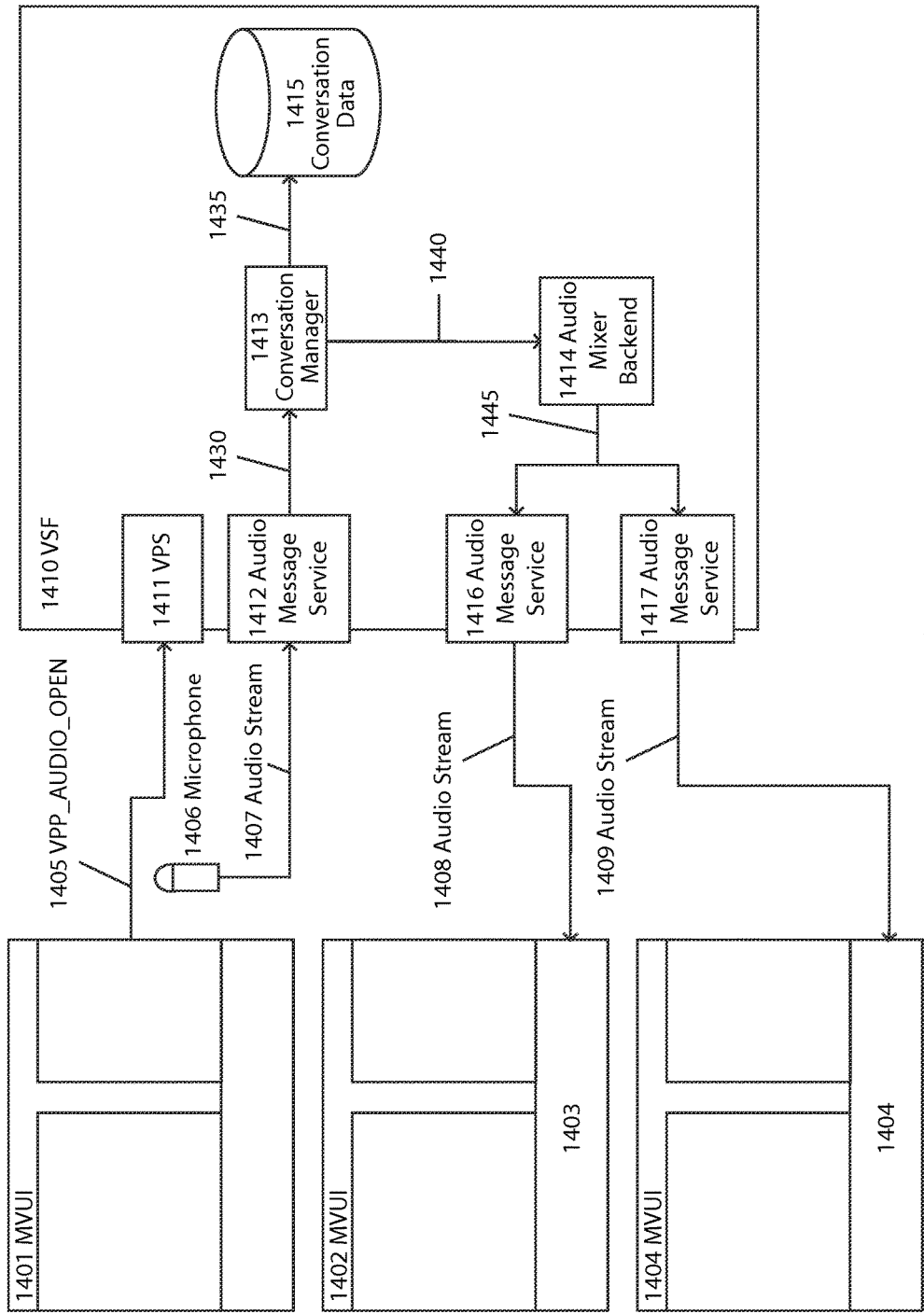
FIG. 14 is a block diagram of a communicator audio transport in an MVUI, in accordance with an embodiment of the invention.

FIG. 14 is a block diagram of a communicator audio transport in an MVUI, in accordance with an embodiment of the invention. For a user to audio chat with other attendees, they may use a working microphone (1406) on the device that they are using to run the MVUI (1401). With audio messages enabled (button (1205) from FIG. 12), a VPP AUDIO OPEN message (1405) is sent to the VPS (1411) which will in turn have alerted the Audio Message Service (1412) to start receiving an audio stream (1407) from the MVUI (1401).

On receipt of the audio stream (1407), the audio message service (1412) will send (1430) the data to the Conversation Manager (1413) which will either directly send (1445) the stream to each recipients' audio message service (1416, 1417), who can be found (1435) in the Conversation Database (1415), or will first pass (1440) it through an audio mixer backend service (1414) which will mix all incoming audio streams together before forwarding the mixed data to the recipients' audio message services (1416, 1417). The audio streams (1408, 1409) from the VSF (1410) will be received by the communicators (1403, 1404) and played back on their users' devices.

Figure 15:
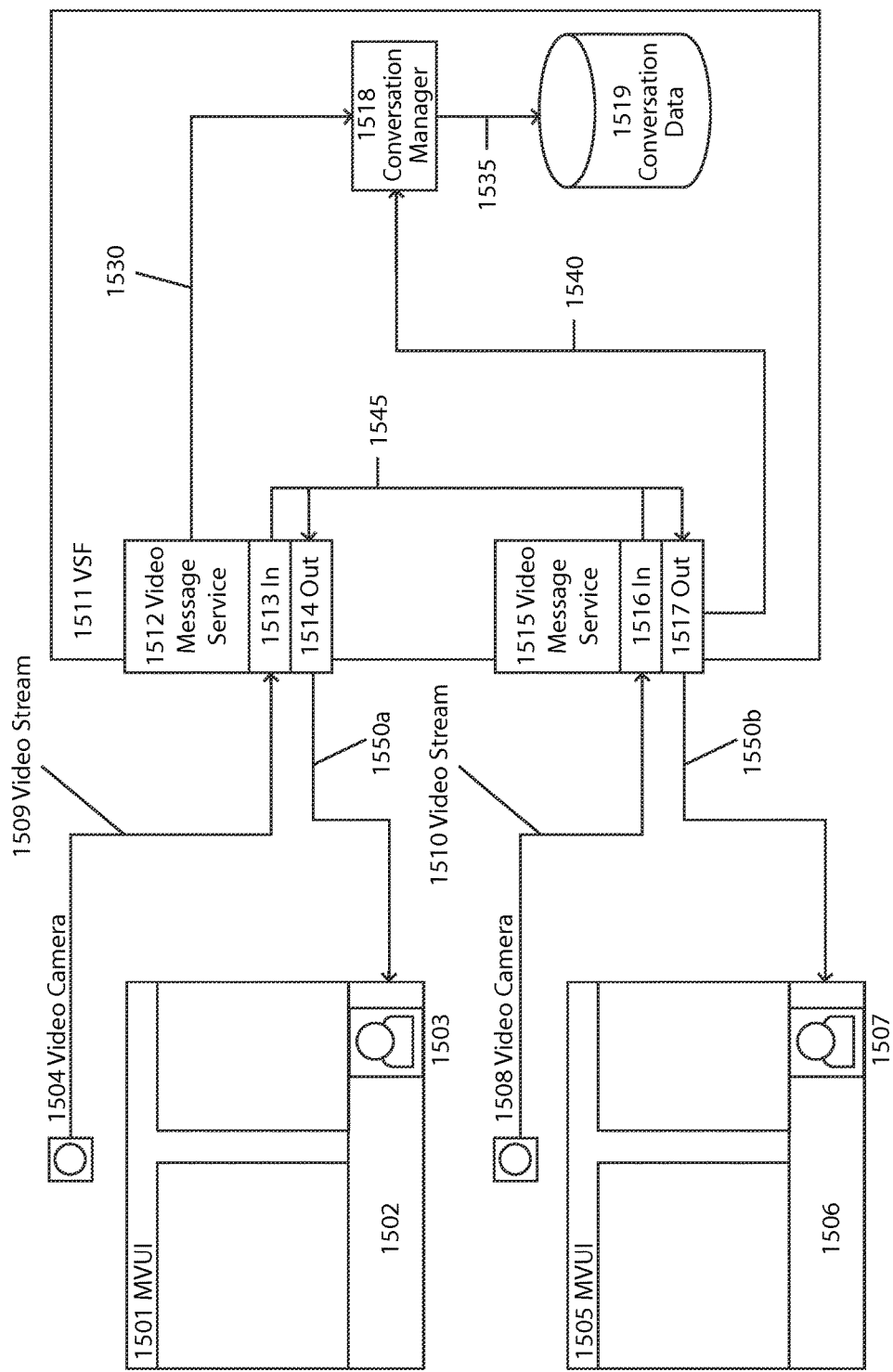
FIG. 15 is a block diagram of a communicator video transport in an MVUI, in accordance with an embodiment of the invention.

FIG. 15 is a block diagram of a communicator video transport in an MVUI, in accordance with an embodiment of the invention. To enable video communication, button (1206) from FIG. 12 should have been selected. This selection will allow a user's attached video camera (1504), or web cam, to start to stream data to a listening Video Message Service (1512). Similarly to audio and text messaging, the Conversation Manager (1518) is used (1530) by the service (1512) to discover which users should receive the video streams by checking (1535) its database (1519) for attendee and friend information.

The Video Message Service (1512) receiving the incoming video (via a private input handler 1513) will stream it directly (1545) to the outgoing Video Message Services output handler (1517) from where it will be forwarded (1550b) to the receiving MVUI's (1505) communicator (1506) and displayed.

The receiving MVUI (1505) with video enabled will also be acting as a sender using its own video camera (1508) and sending its video stream (1510) to the input handler (1516) of its Video Message Service (1515). This video data will be in turn sent to the output handler (1514) of the Video Message Service (1512) for streaming (1550a) to the MVUI's (1501) Communicator (1502) for display in a small video window (1503).

Figure 16:
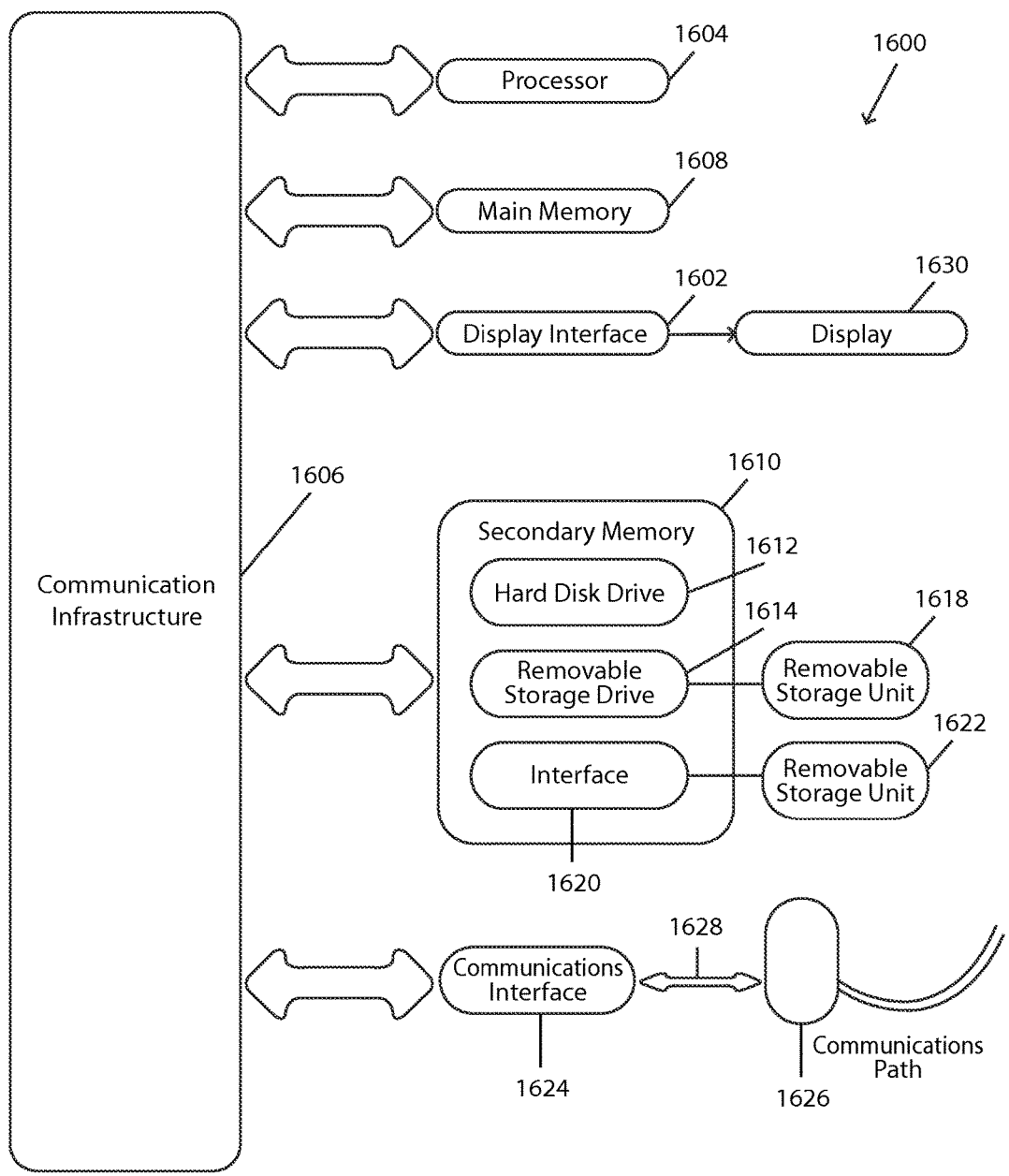
FIG. 16 is a block diagram of an exemplary computer system useful for implementing one or more computing devices in an embodiment of the invention.

FIG. 16 is a block diagram of an exemplary computer system useful for implementing one or more computing devices in an embodiment of the invention.

In one aspect, system 100 (and/or other variations of system 100 described above) may include one or more computer systems capable of carrying out the functionality described herein. An example of a computer system 1600 is shown in FIG. 16. Computer system 1600 includes one or more processors, such as processor 1604. Processor 1604 may be connected to a communication infrastructure 1606, such as a communications bus or network, for example. Various software aspects are described in terms of this exemplary computer system. After reading this description, it will become apparent to a person skilled in the relevant art(s) how to implement the invention using other computer systems and/or architectures.

Computer system 1600 can include a display interface 1602 that forwards graphics, text and other data from communication infrastructure 1606, or from a frame buffer (not shown), for display via display unit 1630. Computer system 1600 may also include a main memory 1608, preferably a random access memory (RAM), and may further include a secondary memory 1610. Secondary memory 1610 may include, for example, a hard disk drive 1612 and/or a removable storage drive 1614, representing a floppy disk drive, a magnetic tape drive, or an optical disk drive, for example. Removable storage drive 1614 reads from and/or writes to a removable storage unit 1618 in a manner well known in the relevant art. Removable storage unit 1618 represents a floppy disk, magnetic tape, or an optical disk, which is read by and written to by removable storage drive 1614. As can be appreciated, removable storage unit 1618 includes a computer usable storage medium having stored therein computer software and/or data.

In alternative aspects, secondary memory 1610 may include other similar devices for allowing computer programs or other instructions to be loaded into computer system 1600. Such devices may include, for example, a removable storage unit 1622 and an interface 1620. Examples of such may include a program cartridge and cartridge interface, such as may be found in video game devices, a removable memory chip, such as an erasable programmable read only memory (EPROM), or programmable read only memory (PROM), and associated socket and other removable storage units 1622 and interfaces 1620, which allow software and data to be transferred from the removable storage unit 1622 to computer system 1600.

Computer system 1600 may also include a communications interface 1624. Communications interface 1624 allows software and data to be transferred between computer system 1600 and external devices. Examples of a communications interface 1624 may include a modem, a network interface such as an Ethernet card, a communications port, and a Personal Computer Memory Card International Association (PCMCIA) slot and card. Software and data transferred via communications interface 1624 are in the form of non-transitory signals 1628 which may be electronic, electromagnetic, optical or other signals capable of being received by communications interface 1624. Signals 1628 may be provided to communications interface 1624 via a communications path or channel 1626. Channel 1626 may carry signals 1628 and may be implemented using wire or cable, fiber optics, a telephone line, a cellular link, a radio frequency (RF) link, and other communications channels.

In this document, the terms "computer program medium" and "computer usable medium" are used to generally refer to media such as removable storage drive 1614, a hard disk installed in hard disk drive 1612, and signals 1628. These computer program products provide software to computer system 1600, wherein the present invention is directed to such computer program products.

Computer programs (also referred to as computer control logic), may be stored in main memory 1608 and/or secondary memory 1610. Computer programs may also be received via communications interface 1624. Such computer programs, when executed, enable computer system 1600 to perform the features of the present invention, as discussed herein. In particular, the computer programs, when executed, enable processor 1604 to perform the features of the present invention. Accordingly, such computer programs represent controllers of the computer system 1600.

In an aspect where the invention is implemented using software, the software may be stored in a computer program product and loaded into computer system 1600 using removable storage drive 1614, hard drive 1612 or communications interface 1624. The control logic (software), when executed by processor 1604, causes processor 1604 to perform the functions of the invention as described herein.

In another aspect, the invention is implemented primarily in hardware using, for example, hardware components such as application specific integrated circuits (ASICs). Implementation of the hardware state machine so as to perform the functions described herein will be apparent to persons skilled in the relevant art(s).

As will be apparent to one skilled in the relevant art(s) after reading the description herein, the computer architecture shown herein in various drawings may be configured as a desktop, a laptop, a server, a tablet computer, a PDA, a mobile computer, an intelligent communications device or the like. In yet another aspect, the invention may be implemented using a combination of both hardware and software.

Those skilled in the art will realize, after reading the discussion herein, that other suitable materials or combination of suitable materials can be used for the components in the smart helmets disclosed herein. Those skilled in the art will also realize, after reading the discussion herein, that the assembly, manufacture, and/or construction of the components of a smart helmet disclosed herein may be selectively varied based on cost, ease of manufacturing, or/and other considerations. Additionally, the parts or components in a smart helmet can be suitably varied or substituted with other parts or components or shapes, as manufacturing and parts technologies improve in the future.

Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system for viewing and participating in at least one virtualised location, the system comprising:
    a plurality of cameras for generating a 360 degrees streaming video that comprises a virtual perspective and a first person perspective of an event in the at least one virtualised location or a 3-dimensional (3D) camera for generating the 360 degrees streaming video that comprises the virtual perspective and the first person perspective of the event in the at least one virtualised location;
    wherein the plurality of cameras is coupled to a headgear or the 3D camera is coupled to the headgear;
    wherein the headgear comprises a communications subsystem for wirelessly transmitting the 360 degrees streaming video from the headgear;
    a server including a processor that executes software that provides functionalities of a virtual layer;
    wherein the server receives the 360 degrees streaming video and the processor processes the 360 degrees streaming video;
    wherein the virtual layer stores the 360 degrees streaming video and data transmitted by the communications subsystem that is remote from the server;
    wherein the 360 degrees streaming video and the data relate to the event associated with the at least one virtualised location;
    wherein the server wirelessly transmits the 360 degrees streaming video and the data to an interface so that the interface displays the 360 degrees streaming video and the data in order to provide a virtual presence perspective of the event;
    wherein the virtual layer comprises a first memory area that stores the 360 degrees streaming video and the data and a second memory area that stores identification data that identifies the event associated with the at least one virtualised location;
    wherein the interface is included in a first computing device associated with a first virtual attendee who is virtually attending the event associated with the at least one virtualised location;
    wherein the server wirelessly transmits the 360 degrees streaming video and the data to a second interface so that the second interface displays the 360 degrees streaming video and the data;
    wherein the second interface is included in a second computing device associated with a second virtual attendee who is virtually attending the event associated with the at least one virtualised location; and
    wherein the virtual layer comprises a third memory area that stores a first position data indicating a first virtual position of the first computing device of the first virtual attendee and a fourth memory area that stores a second position data indicating a second virtual position of the second computing device of the second virtual attendee;
    wherein the virtual layer shares the memory areas such that the first virtual attendee and the second virtual attendee view each other as virtually attending the event associated with the at least one virtualised location and are able to communicate with each other through the virtual layer so that the virtual layer provides virtual presence perspectives of events in a physical world.

2. The system of claim 1, wherein the virtual layer permits a replay of at least a highlight of the event.

3. The system of claim 1, wherein the data comprises an event data.

4. The system of claim 1, wherein the virtual layer permits a participation in more than one event concurrently.

5. The system of claim 1, wherein the event is captured by the plurality of cameras in order to provide a coverage of a virtual presence in the event.

6. The system of claim 1, wherein the virtual layer permits a discovery of any participant in the event.

7. The system of claim 1, wherein the data comprises betting information.

8. The system of claim 1, wherein the data comprises a location data on the event.

9. The system of claim 1, wherein the interface displays more than one streaming video.

10. A method for viewing and participating in at least one virtualised location, the method comprising:
    generating, by a plurality of cameras, a 360 degrees streaming video that comprises a virtual perspective and a first person perspective of an event in the at least one virtualised location or generating, by a 3-dimensional (3D) camera, the 360 degrees streaming video that comprises the virtual perspective and the first person perspective of the event in the at least one virtualised location;
    wherein the plurality of cameras is coupled to a headgear or the 3D camera is coupled to the headgear;
    wherein the headgear comprises a communications subsystem;
    wirelessly transmitting, by the communications subsystem, the 360 degrees streaming video from the headgear;
    executing, by a processor in a server, software that provides functionalities of a virtual layer;
    wherein the server receives the 360 degrees streaming video and the processor processes the 360 degrees streaming video;
    wherein the virtual layer stores the 360 degrees streaming video and data transmitted by the communications subsystem that is remote from the server;
    wherein the 360 degrees streaming video and the data relate to the event associated with the at least one virtualised location;
    wirelessly transmitting, by the server, the 360 degrees streaming video and the data to an interface so that the interface displays the 360 degrees streaming video and the data in order to provide a virtual presence perspective of the event;
    wherein the virtual layer comprises a first memory area that stores the 360 degrees streaming video and the data and a second memory area that stores identification data that identifies the event associated with the at least one virtualised location;
    wherein the interface is included in a first computing device associated with a first virtual attendee who is virtually attending the event associated with the at least one virtualised location;
    wherein the server wirelessly transmits the 360 degrees streaming video and the data to a second interface so that the second interface displays the 360 degrees streaming video and the data;
    wherein the second interface is included in a second computing device associated with a second virtual attendee who is virtually attending the event associated with the at least one virtualised location; and
    wherein the virtual layer comprises a third memory area that stores a first position data indicating a first virtual position of the first computing device of the first virtual attendee and a fourth memory area that stores a second position data indicating a second virtual position of the second computing device of the second virtual attendee;
    wherein the virtual layer shares the memory areas such that the first virtual attendee and the second virtual attendee view each other as virtually attending the event associated with the at least one virtualised location and are able to communicate with each other through the virtual layer so that the virtual layer provides virtual presence perspectives of events in a physical world.

11. The method of claim 10, further comprising: permitting a replay of at least a highlight of the event.

12. The method of claim 10, wherein the data comprises an event data.

13. The method of claim 10, further comprising: permitting a participation in more than one event concurrently.

14. The method of claim 10, further comprising: capturing the event with the plurality of cameras in order to provide a coverage of a virtual presence in the event.

15. The method of claim 10, further comprising: permitting a discovery of any participant in the event.

16. The method of claim 10, wherein the data comprises betting information.

17. The method of claim 10, wherein the data comprises a location data on the event.

18. The method of claim 10, wherein the interface displays more than one streaming video.

19. An article of manufacture, comprising:
    a non-transitory computer-readable medium having stored thereon instructions operable to permit an apparatus to perform a method comprising:
    generating, by a plurality of cameras, a 360 degrees streaming video that comprises a virtual perspective and a first person perspective of an event in at least one virtualised location or generating, by a 3-dimensional (3D) camera, the 360 degrees streaming video that comprises the virtual perspective and the first person perspective of the event in the at least one virtualised location;
    wherein the plurality of cameras is coupled to a headgear or the 3D camera is coupled to the headgear;
    wherein the headgear comprises a communications subsystem;
    wirelessly transmitting, by the communications subsystem, the 360 degrees streaming video from the headgear;
    executing, by a processor in a server, software that provides functionalities of a virtual layer;
    wherein the server receives the 360 degrees streaming video and the processor processes the 360 degrees streaming video;
    wherein the virtual layer stores the 360 degrees streaming video and data transmitted by the communications subsystem that is remote from the server;
    wherein the 360 degrees streaming video and the data relate to the event associated with the at least one virtualised location;
    wirelessly transmitting, by the server, the 360 degrees streaming video and the data to an interface so that the interface displays the 360 degrees streaming video and the data in order to provide a virtual presence perspective of the event;
    wherein the virtual layer comprises a first memory area that stores the 360 degrees streaming video and the data and a second memory area that stores identification data that identifies the event associated with the at least one virtualised location;

wherein the interface is included in a first computing device associated with a first virtual attendee who is virtually attending the event associated with the at least one virtualised location;

wherein the server wirelessly transmits the 360 degrees streaming video and the data to a second interface so that the second interface displays the 360 degrees streaming video and the data;

wherein the second interface is included in a second computing device associated with a second virtual attendee who is virtually attending the event associated with the at least one virtualised location; and wherein the virtual layer comprises a third memory area that stores a first position data indicating a first virtual position of the first computing device of the first virtual attendee and a fourth memory area that stores a second position data indicating a second virtual position of the second computing device of the second virtual attendee;

wherein the virtual layer shares the memory areas such that the first virtual attendee and the second virtual attendee view each other as virtually attending the event associated with the at least one virtualised location and are able to communicate with each other through the virtual layer so that the virtual layer provides virtual presence perspectives of events in a physical world.

20. The article of manufacture of claim 19, wherein the interface displays more than one streaming video.

* * * * *